United States Patent
Ruiz Velazquez et al.

(10) Patent No.: US 9,898,497 B2
(45) Date of Patent: Feb. 20, 2018

(54) VALIDATING COHERENCY BETWEEN MULTIPLE DATA SETS BETWEEN DATABASE TRANSFERS

(71) Applicant: Oracle International Corporation, Redwood Shores, CA (US)

(72) Inventors: Lesvia Elena Ruiz Velazquez, Guadalajara (MX); Paolo Juvara, San Francisco, CA (US); Renzo Zagni, Union City, CA (US); Benjamin Villegas Medina, Chapalita Oriente (MX); Ami Davis, Townsend, TN (US); Calvin Nakata, Chicago, IL (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 351 days.

(21) Appl. No.: 14/675,068

(22) Filed: Mar. 31, 2015

(65) Prior Publication Data
US 2016/0292206 A1   Oct. 6, 2016

(51) Int. Cl.
G06F 17/30   (2006.01)
G06F 3/0484   (2013.01)

(52) U.S. Cl.
CPC .... *G06F 17/30371* (2013.01); *G06F 3/04842* (2013.01); *G06F 17/3056* (2013.01);
(Continued)

(58) Field of Classification Search
CPC combination set(s) only.
See application file for complete search history.

(56) References Cited

U.S. PATENT DOCUMENTS 6,151,608 A   11/2000   Abrams
6,373,950 B1 *  4/2002   Rowney ............... G06Q 20/12
                                                380/255
(Continued)

FOREIGN PATENT DOCUMENTS

WO   96/34354   10/1996

OTHER PUBLICATIONS

Miscot Systems, "SwiftForm as Data Migration Tool" retrieved from the internet : http://www.miscot.com/swiftform.htm.
(Continued)

*Primary Examiner* — Shyue Jiunn Hwa
(74) *Attorney, Agent, or Firm* — Kilpatrick Townsend & Stockton LLP

(57) ABSTRACT

A user interface may be designed to receive conflicting data from multiple data sources during a merger of legacy computer systems. The interface automatically validates the conflicting data against each other to generate a final data set for review. Summary information for each data set can be displayed in a single interface such that the summary data sets are individually selectable and provide an overview of the data merger process for each data set. By drilling down through the summary data, the user interface can display individual data sets where data conflicts can be resolved, missing data can be provided, and duplicate data can be eliminated. When the merger process is complete, the interface can translate the data set into a standardized format that can be exported to form generation modules to generate, for example, a welcome letter based on the translated data set.

17 Claims, 20 Drawing Sheets

(52) U.S. Cl.
CPC .. *G06F 17/30368* (2013.01); *G06F 17/30569* (2013.01); *G06F 17/30876* (2013.01)

(56) References Cited

U.S. PATENT DOCUMENTS

| | | | |
|---|---|---|---|
| 6,581,039 | B2 | 6/2003 | Marpe et al. |
| 6,615,220 | B1 | 9/2003 | Austin et al. |
| 7,058,807 | B2 | 6/2006 | Grawrock et al. |
| 7,159,209 | B1 | 1/2007 | Srinivasan et al. |
| 7,299,216 | B1 | 11/2007 | Liang et al. |
| 7,774,300 | B2 | 8/2010 | Hsiao et al. |
| 7,890,430 | B2 | 2/2011 | Lopatic |
| 8,290,951 | B1 | 10/2012 | Joa et al. |
| 8,291,501 | B2 | 10/2012 | Lynch |
| 8,473,450 | B2 | 6/2013 | Bakalash et al. |
| 8,639,675 | B2 * | 1/2014 | Cotichini .......... G06F 17/30595 707/696 |
| 8,725,701 | B2 | 5/2014 | Parkes et al. |
| 8,869,020 | B2 | 10/2014 | Daga |
| 9,182,963 | B2 * | 11/2015 | Mallya ................. G06F 8/60 |
| 2002/0107809 | A1 | 8/2002 | Biddle et al. |
| 2004/0064487 | A1 | 4/2004 | Nguyen et al. |
| 2004/0103365 | A1 | 5/2004 | Cox |
| 2004/0139111 | A1 | 7/2004 | Schoettger et al. |
| 2005/0251812 | A1 | 11/2005 | Hayward |
| 2006/0004595 | A1 | 1/2006 | Rowland et al. |
| 2006/0112123 | A1 | 5/2006 | Clark et al. |
| 2006/0222163 | A1 | 10/2006 | Bank et al. |
| 2006/0287961 | A1 | 12/2006 | Mori et al. |
| 2007/0198562 | A1 * | 8/2007 | Kulkarni .................. G06F 8/20 |
| 2008/0016041 | A1 | 1/2008 | Frost et al. |
| 2008/0205655 | A1 | 8/2008 | Wilkins et al. |
| 2008/0235805 | A1 | 9/2008 | Pfitzmann et al. |
| 2009/0249488 | A1 | 10/2009 | Robinson et al. |
| 2012/0023101 | A1 | 1/2012 | Heimendinger et al. |
| 2012/0173476 | A1 | 7/2012 | Rizvi |
| 2013/0024760 | A1 | 1/2013 | Vogel et al. |
| 2013/0086064 | A1 | 4/2013 | Salch et al. |
| 2013/0124957 | A1 | 5/2013 | Oppenheimer et al. |
| 2013/0305149 | A1 | 11/2013 | Dimitrov et al. |
| 2016/0019281 | A1 | 1/2016 | Hariharan et al. |

OTHER PUBLICATIONS

Arbutus Software, "Migrate", retrieved from the internet: http://www.arbutussoftware.com/products-migrate.htm.

Informatica, "Enterprise-wide data quality with Informatica Data Explorer and Informatica Data Quality", retrieved from the internet: http://www.sun.com/third-party/srsc/resources/information/InfaDQDEbrochure.pdf.

Applied Database Technology, "DataMAPPER", retrieved from the internet : http://www.adbtech.com/data1.html.

Baycastle Software Ltd, "DataSlave 1.2" [Accessed on Oct. 7, 2015. Retrieved from the internet: <http://www.modemtools.com/programs/Baycastle-Software-Ltd/DataSlave.htm >.

Skyway Technology "DatabaseBridge", retrieved from the internet: http://www.skywaytechnology.com/products0.htm.

caBIG "caTissue Data Migration" retrieved from the internet: http://gforge.nci.nih.gov/docman/view.php/18/7786/caTissueDataMigration_TBPT_F2F_2007.ppt.

Zhao, et al. "Exploring Attribute Correspondences Across Heterogeneous Databases by Mutual Information" retrieved from the internet: http://delivery.acm.org/10.1145/1280000/1278034/71eerk1m02gfjrx6.pdf?key1=1278034&key2=7201407021&coll=Portal&dl=GUIDE&CFID=22383522&CFTOKEN=43600732.

Oblog Consulting and FCUL "Efficient development of data migration transformations" retrieved from the internet: http://delivery.acm.org/10.1145/1010000/1007692/p915-carreira.pdf?key1=1007692&key2=9481407021&coll=Portal&dl=GUIDE&CFID=22383522&CFTOKEN=43600732.

US West Advanced Technologies "Issues and approaches for migration/cohabitation between legacy and new systems", retrieved from the internet: http://delivery.acm.org/10.1145/180000/170145/p471-nassif.pdf?key1=170145&key2=3312407021&coll=Portal&dl=GUIDE&CFID=22383522&CFOTKEN=43600732.

Import Customers from a Spreadsheet Into CRM Software, Amphis Software, http://www.amphis-software.com/spreadsheet.htm, Copyright 2013, 4 pages.

Make Your SAP Processes Easier to Use, AutomationAnywhere.com, http://www.automationanywhere.com/solutions/sapautomation.htm, Copyright 2013, 1 page.

SAP & Excel: Simple, Secure, More Usable, AutomationAnywhere.com, http://www.automationanywhere.com/landing/sap-to-excel.htm, 2014, 1 page.

Filemaker, FileMaker Platform: Streamline Your Business, FileMaker Platform Overview, https://www.filemaker.com/products/overview.html#industry, 2014, 3 pages.

Jia et al., A direct method of data exchange between XML and relational database, Information Technology Interfaces, vol. 1, Jun. 7-10, 2004, pp. 127-132.

Lakshmanan et al., On Querying Spreadsheets, IEEE Xplore Abstract, http://ieeexplore.ieee.org/xpl/articleDetails.jsp?tp=&arnumber=655769, Abstract Only, 1998, 2 pages.

Oracle Hyperion Smart View for Office: User's Guide, Oracle, Oracle Enterprise Performance management System, Release 11.1.2.2, 2012, 336 pages.

U.S. Appl. No. 14/334,556, Non-Final Office Action dated Oct. 19, 2016, 14 pages.

U.S. Appl. No. 14/334,556, Final Office Action dated Apr. 21, 2017, 24 pages.

* cited by examiner

Company List

| Company Name | Project No. | No. Contacts | Load Status | Company Status | % Complete |
|---|---|---|---|---|---|
| ACME Sales | 878 | 0 / 388 | Reloaded | In Process | 0% |
| Cygnus Tires | 2112 | 838 / 1743 | Needs Reload | In Process | 48% |
| Peart Financial | 845 | 577 / 1435 | Complete Load | Test | 40% |
| Eddie's Guitars | 5150 | 24 / 404 | Complete Load | Canceled | 5% |
| Ute Fan Gear | 65 | 300 / 975 | Complete Load | In Process | 30% |

Company Status is "In Process, Test, Canceled" — 404

Companies Table

| Column Names | |
|---|---|
| company_id_1 | company_name |
| company_id_2 | load_status |
| company_id_3 | company_status |
| company_id_4 | pct_complete |
| company_attr_1 | company_attr_2 |
| ⋮ | ⋮ |
| company_attr_11 | company_attr_12 |
| created_by | last_updated_by |
| creation_date | last_update_date |

Mapping Table

| Column Names |
|---|
| Global_Column |
| Local_Column |
| Data_Type |
| Size |

FIG. 8

Contacts Table

| Column Names | |
|---|---|
| company_id_[1-4] | contact_id[1-6] |
| customer_name | first_name |
| contact_email | last_name |
| notes | mailing_address_[1-2] |
| exported_data | city |
| contact_attr_[1-16] | state |
| created_by | last_updated_by |
| creation_date | last_updated_date |

Company Details

< Back | Reload from Source — 1102 | Save | Download | Upload | Upload Log | Preview Final

Pearl Financial

40% | Company Status: In Process ▶ — 1106

Project No. 845
No. of Contacts: 577 / 1435
Load Status: Complete Load

1104

Type [▶] Customer [ ] ◀ Show ☑ CSI ☐ Product ☐ Service Part

| Customer Name | Contact No. | First Name | Last Name | Email | Valid Email? | Mailing Address | Last Exported | Copy | Import Bill-to-Contact | Delete |
|---|---|---|---|---|---|---|---|---|---|---|
| Anthem Bank | 1 | Gary | Weinrib | gr@anthem.com | ☑ | 2112 Lakeside Park... | 1/23/2014 | 📄 | ✉ | 🗑 |
| Anthem Bank | 2 | Alex | | | ☒ | | (null) | 📄 | ✉ | 🗑 |
| Snow Dog Skis | 1 | | | | ☒ | | (null) | 📄 | ✉ | 🗑 |

1 — 3 of 1435

Errors Table

| Column Names ||
|---|---|
| company_id_[1-4] | contact_id[1-6] |
| customer_name | first_name |
| contact_email | last_name |
| error_message | debug_step |
|  | debug_line |

VALIDATING COHERENCY BETWEEN MULTIPLE DATA SETS BETWEEN DATABASE TRANSFERS

BACKGROUND

The phrase mergers and acquisitions ("M&A") refers to the aspect of corporate strategy, corporate finance and management dealing with the buying, selling and combining of different companies that can aid, finance, or help a growing company in a given industry grow rapidly without having to create another business entity. When companies are acquired or merged, it is often the case that data from one company needs to be transferred to the platform of the acquiring company. However, the platform of the company being acquired may be different from the platform of the acquiring company. For example, the acquired company may use SAP® business software, whereas the acquiring company uses Oracle® business software. In such a case, the data must be migrated from one platform to another.

In a typical data migration, the data would be compiled for loading, a load would be attempted into the destination system, rejected records would be analyzed and corrected, and then another attempt would be made to load them. Once in the system, the data would be tested and any which were incorrect would be deleted and reloaded, or more likely would need to be corrected and retested by loading on a new environment.

BRIEF SUMMARY

In one embodiment, a method of generating a user interface for validating and finalizing data received from legacy computer systems may be presented. The method may include receiving data records from a plurality of data sources, each of the plurality of data sources being associated with one of the legacy computer systems. The method may also include validating the data records by detecting missing values in the data records, detecting duplicate values in the data records, detecting orphaned records, and mapping records between the plurality of data sources. The method may additionally include extracting a first set of data from the validated data records; the first set of data being sourced by a first legacy computer system. The method may further include generating a user interface that displays summary information associated with the first set of data for the legacy computer system among summary information of similar data for other legacy computer systems together in the user interface. The method may also include receiving a selection through the user interface, where the selection selects the summary information of the legacy computer system from among the summary information of the similar data for the other legacy computer systems. The method may additionally include causing to be displayed, through the user interface, the first set of data for the legacy computer system, and receiving commands to edit the first set of data through the user interface. The method may further include exporting, through the user interface, the first set of data, wherein the first set of data is converted into a new data format.

In another embodiment, a non-transitory computer-readable medium may be presented. The computer-readable memory may comprise a sequence of instructions which, when executed by one or more processors, causes the one or more processors to perform operation including receiving data records from a plurality of data sources, each of the plurality of data sources being associated with one of the legacy computer systems. The operations may also include validating the data records by detecting missing values in the data records, detecting duplicate values in the data records, detecting orphaned records, and mapping records between the plurality of data sources. The operations may additionally include extracting a first set of data from the validated data records; the first set of data being sourced by a first legacy computer system. The operations may further include generating a user interface that displays summary information associated with the first set of data for the legacy computer system among summary information of similar data for other legacy computer systems together in the user interface. The operations may also include receiving a selection through the user interface, where the selection selects the summary information of the legacy computer system from among the summary information of the similar data for the other legacy computer systems. The operations may additionally include causing to be displayed, through the user interface, the first set of data for the legacy computer system, and receiving commands to edit the first set of data through the user interface. The operations may further include exporting, through the user interface, the first set of data, wherein the first set of data is converted into a new data format.

In yet another embodiment, a system may be presented. The system may include one or more processors and a memory communicatively coupled with and readable by the one or more processors. The memory may comprise a sequence of instructions which, when executed by the one or more processors, cause the one or more processors to perform operation including receiving data records from a plurality of data sources, each of the plurality of data sources being associated with one of the legacy computer systems. The operations may also include validating the data records by detecting missing values in the data records, detecting duplicate values in the data records, detecting orphaned records, and mapping records between the plurality of data sources. The operations may additionally include extracting a first set of data from the validated data records; the first set of data being sourced by a first legacy computer system. The operations may further include generating a user interface that displays summary information associated with the first set of data for the legacy computer system among summary information of similar data for other legacy computer systems together in the user interface. The operations may also include receiving a selection through the user interface, where the selection selects the summary information of the legacy computer system from among the summary information of the similar data for the other legacy computer systems. The operations may additionally include causing to be displayed, through the user interface, the first set of data for the legacy computer system, and receiving commands to edit the first set of data through the user interface. The operations may further include exporting, through the user interface, the first set of data, wherein the first set of data is converted into a new data format.

In each of these embodiments, one or more of the following features may be included in any combination and without limitation. The method/operations may include exporting the first set of data to a client device; and importing the first set of data from the client device, where the first set of data has been edited on the client device. The method/operations may also include translating the first set of data into a datasheet format prior to exporting the first set of data to the client device. The method/operations may additionally include receiving a command, through the user interface, to reload the first set of data; accessing an interface table that comprises validated data records for the first set of data; importing the validated data records; comparing the validated data records with the first set of data; and merging the validated data records with the first set of data. The method/operations may further include generating a mapping table between the interface table and a table of the user interface, where the mapping table links columns in the interface table with columns in the table of the user interface. Merging the validated data records with the first set of data may include detecting data records that exist in the first set of data that no longer exist in the interface table; detecting data records that exist in both the interface table and the first set of data with conflicting values; and detecting data records that exist in the interface table but that no longer exist in the first set of data. The method/operations may further include receiving a command, through the user interface, to export the first set of data to a form generation application, where the first set of data may be stored in a first format; transforming the first set of data from the first format into a second format, the second format being used by the form generation application; and exporting the first set of data in the second format to the form generation application.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 4 illustrates an example of a user interface for viewing and manipulating imported data at a macro level, according to some embodiments.

FIG. 5 illustrates a data structure diagram for storing company information, according to some embodiments.

FIG. 8 illustrates a data structure diagram of a mapping table for linking external data structures with internal data structures, according to some embodiments.

FIG. 10 illustrates a data structure diagram for storing contact information, according to some embodiments.

FIG. 11 illustrates a user interface for viewing and editing imported data at a micro level, according to some embodiments.

FIG. 16 illustrates a data structure diagram of an error table for recording data validation errors during the upload process, according to some embodiments.

DETAILED DESCRIPTION

The migration of data into a transactional system such as Oracle E-Business Suite requires that the source data, whether extracted from one or more source systems or manually entered into spreadsheets, is complete and correct. Multiple entities may reference each other, and each entity must have all required fields populated according to the validation rules the destination system enforces. Additionally, any mappings or references to existing destination system data must also be validated as must any validations required to ensure that the data conforms to the business processes within the company. Failure to correctly reference associated entities or to correctly populate a field will result in the system application program interfaces or Open Interface tables rejecting the record for loading.

Typically in a large migration project, such as those taking place as part of a merger and acquisition, there is a long lead time in the validation process due to the number of iterations of loading, error reporting, error resolution, and re-loading for each record. This can account for as much as 80% of the project duration and 60% of the effort. An example would be the load of support licenses and their associated data, such as customer, address, contacts, and parts. Each license references one of more parts, customers, addresses, and contacts. Thus, to load the license into a new platform the associated data must also be provided. A number of fields need to be populated and in the correct format for each of these entities. A failure to populate a required field or reference will cause the record to be rejected. For example, if the license references a particular combination of customer, address, and contact then the customer data provided must include that customer, address, and contact and in the correct combination.

The process of ensuring the extracted data is complete and correct and will pass all the required system validations is lengthy, complex, and time consuming. This process requires multiple iterations of data extracts being passed between the teams extracting the data, the business analysts determining the transformation of the source data, and the team that finally loads the data into the destination system and reports on the validation failures.

Some embodiments refine the above process by providing a user interface and performing the data validation in real time. By uploading the source data from spreadsheets or entering the data directly into an application, the required validations can be run and reported in real time. The application can highlight rows in the spreadsheets that have data validation issues. Users can then either extract the data back into spreadsheets for manipulation, and then re-upload it, or correct the data directly within the application. Once the data set has passed all validations, it is then uploaded into the transactional system.

Figure 1:
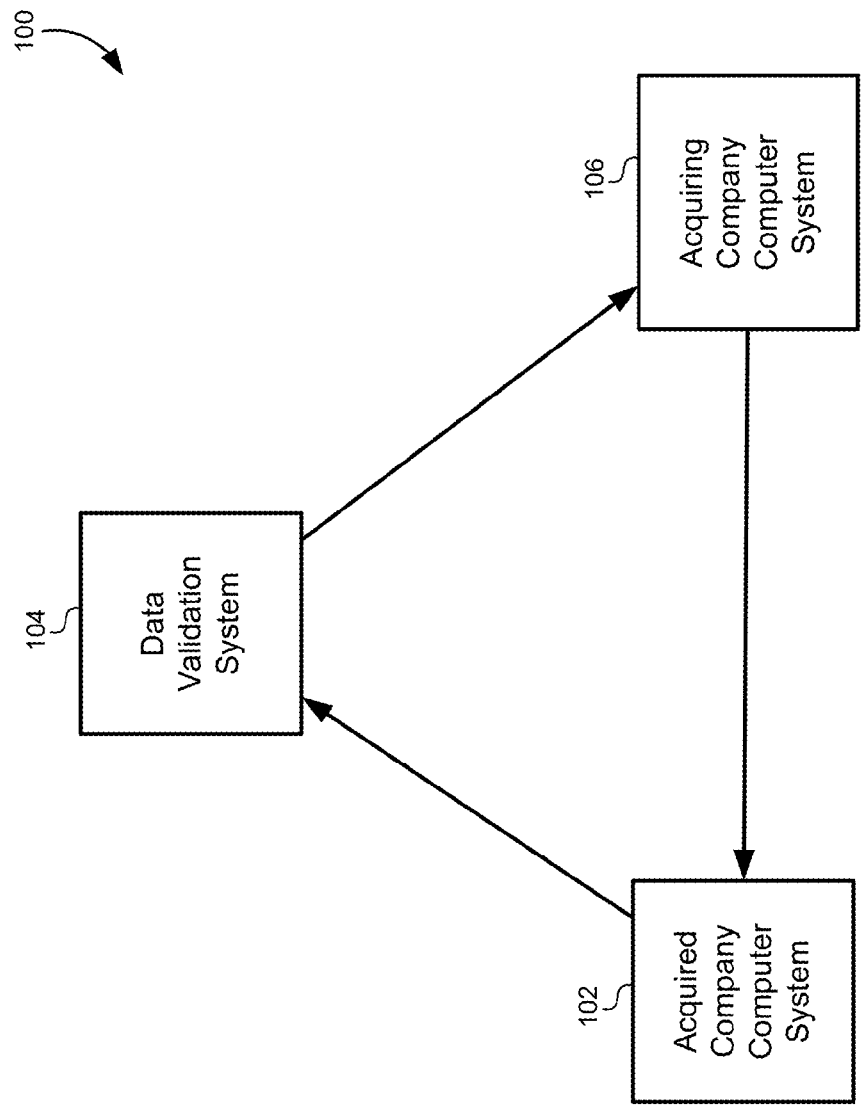
FIG. 1 illustrates an example environment where the data validation module may be utilized, according to some embodiments.

FIG. 1 illustrates an example environment where the data validation module may be utilized. In this example, data from a company being acquired is to be migrated to the system of the company making the acquisition. Acquired company system 102 includes the data to be migrated, and acquiring company system 104 is the destination of the migration. Information technology ("IT") staff at the acquired company establishes a connection between acquired company system 102 and a data validation system 104, such as by a virtual private network ("VPN"), and uploads data from the acquired company system 102 to data validation system 104. The uploaded data is validated and errors may be reported by the IT staff. Validation may include checking for missing values, checking for duplicate values, detecting orphaned records, inspecting the integrity of internal mappings in the data (such as mapping customers to addresses), and validating a mapping of the data to a schema provided by the IT staff of the acquiring company. The IT staff of the acquired company may choose to correct the errors directly in the data validation system 104, or download the data back to the acquired company system 102 and correct it there. This process is iterated until there are no more errors to report. The data from acquired company system 102 is then migrated to the acquired company system 106.

Figure 2:
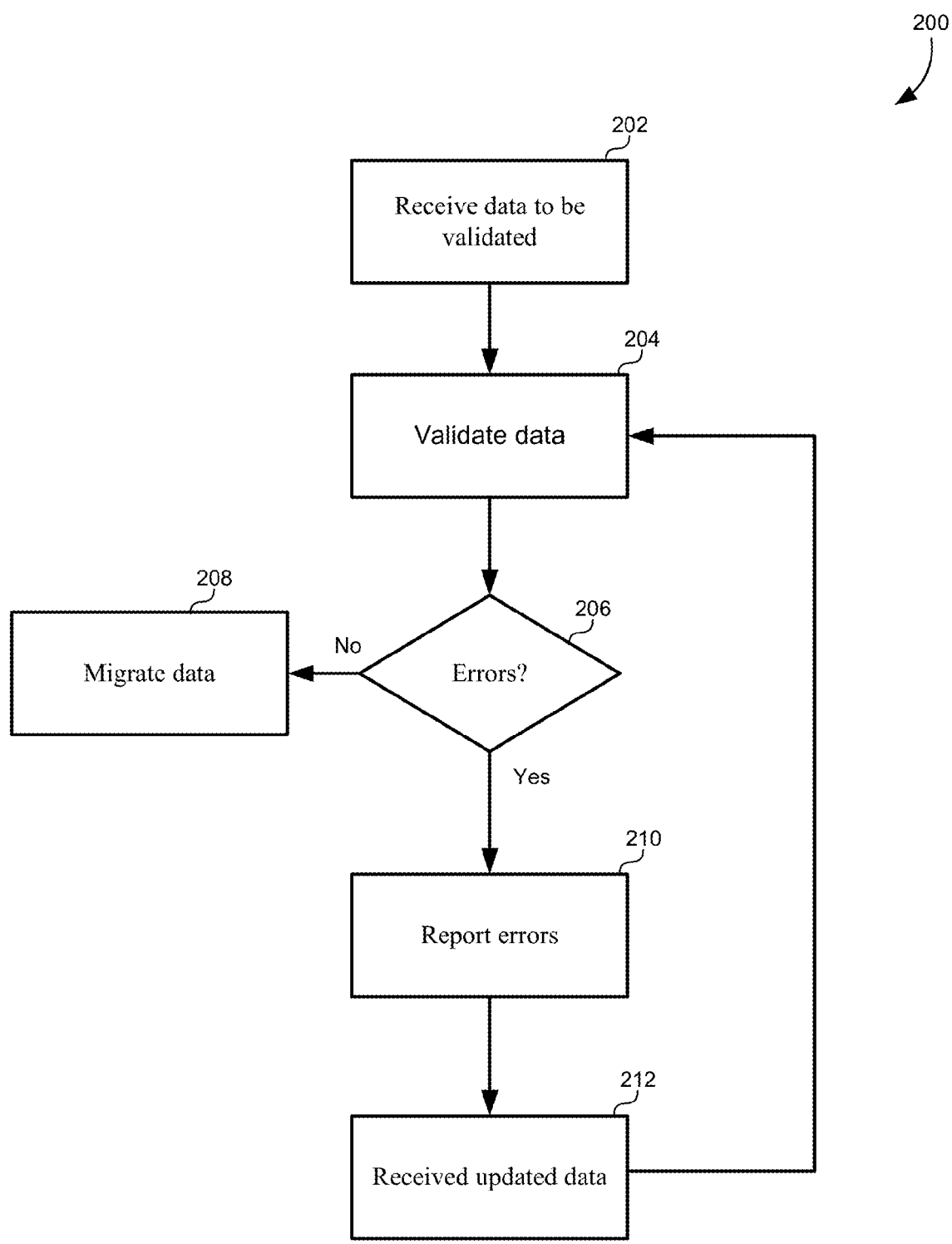
FIG. 2 illustrates a flowchart of the functionality of a data validation process when validating data for migration from one platform to another, according to some embodiments.

FIG. 2 illustrates a flow diagram of the functionality of a data validation process in accordance with an embodiment when validating data for migration from one platform to another. In one embodiment, the functionality of the flow diagram of FIG. 2 is implemented by software stored in memory and executed by a processor. In other embodiments, the functionality can be performed by hardware, or any combination of hardware and software. Data to be validated is first received from the acquired company system 102 (202). The data is then validated, which may include checking for missing values, checking for duplicate values, detecting orphaned records, inspecting the integrity of internal mappings in the data, and validating a mapping of the data to a schema provided by the IT staff of the acquiring company (204). If there are errors in the data (206), the errors are reported to the IT staff of the acquired company (210). Updated data is then received (212), and the data is validated again (204). This process iterates until no errors are detected (208), at which point the data is migrated to the acquiring company system 106 (208).

In an example of the process described by FIG. 2, data can be uploaded from a first computer system to be validated for use on a second computer system. The data can be associated with a software license and/or particular computer platform. The data may also include product names, license terms, license prices, customer information, customer reference numbers, tax registration numbers, customer company names, contact information for an organization, contact names, contact addresses, telephone numbers, support license data, software products, contacts for software products, and/or the like. The validation process can check for missing values, check for duplicate values, detect orphaned records, and map different subsets of data to be imported to each other. For example, the same data may be imported from multiple sources, and therefore may have different formats or levels of completeness and accuracy. Information can come from existing support contracts with the acquiring company that include a company name and contact name, existing customer information for the acquired company, and/or information directly from the acquired company. This mapping may include mapping schemas between the acquired company system and the acquiring company system. After the validation process, a description of errors can be generated on a separate validation computer system and transmitted back to the acquired company computer system. In response, the acquired company computer system can generate an updated response that corrects the errors detected during the validation process. The validation process can then be repeated and any remaining errors can be sent back to the acquired company system. This process can be repeated until all errors are removed. Finally, the validated data can be associated with a second software license on the acquiring company computer system by migrating the validated data from the acquired company computer system to the software platform of the acquiring company computer system. Such a migration can be prevented until the validation process is completed.

Various user interfaces ("UIs") may be provided in order to walk users through the data validation process described above. An exemplary UI is described in the commonly assigned U.S. Pat. No. 8,725,701, which is incorporated herein by reference for all purposes. By allowing users to perform real-time validation prior to data-loading the overall effort of the migration may be reduced as much as 70%, and the duration of the project may be reduced as much as 40%. An advantage of this solution is that the business analysts or administrators involved in compiling the source data can ensure that the data set is complete and correct in advance of loading, and without the involvement of the information technology staff responsible for the destination system. Therefore it is not necessary to load the data into the transactional destination system in order to ensure it is correct.

As described above, when one entity acquires another entity, the customers of the acquired entity need to be informed that support of their products will now be provided by the acquiring entity. During this process, the data received from the acquired entity can be validated, cultivated, and formatted such that the acquiring entity can generate a list of contact information related to each of the products and/or services provided by the acquired entity. For example, during this process at least two letters can be sent to customers of the acquired entity: a letter of intent, which may be identical for all customers or customized depending on the circumstances, and a welcome letter, which is usually personalized for each customer to include its primary contact name, address, support identifier, and product information, such as licenses and serial numbers for supported products and/or services. To generate a welcome letter, customer data—including contact information—has to be obtained for each customer. This data is generally provided from the acquired entity's computer system and validated according to the process described above. Once all the data is received, it has to be completed, verified, and formatted in such a way that it is compatible with a Global Marketing Shared Services (GMSS) portal where the welcome letter uses the contact information to generate a printed PDF file. There is a need for an automated process coupled with a custom user interface for effectively verifying, editing, and preparing contact information for automated processes, such as welcome letter generation.

Figure 3:
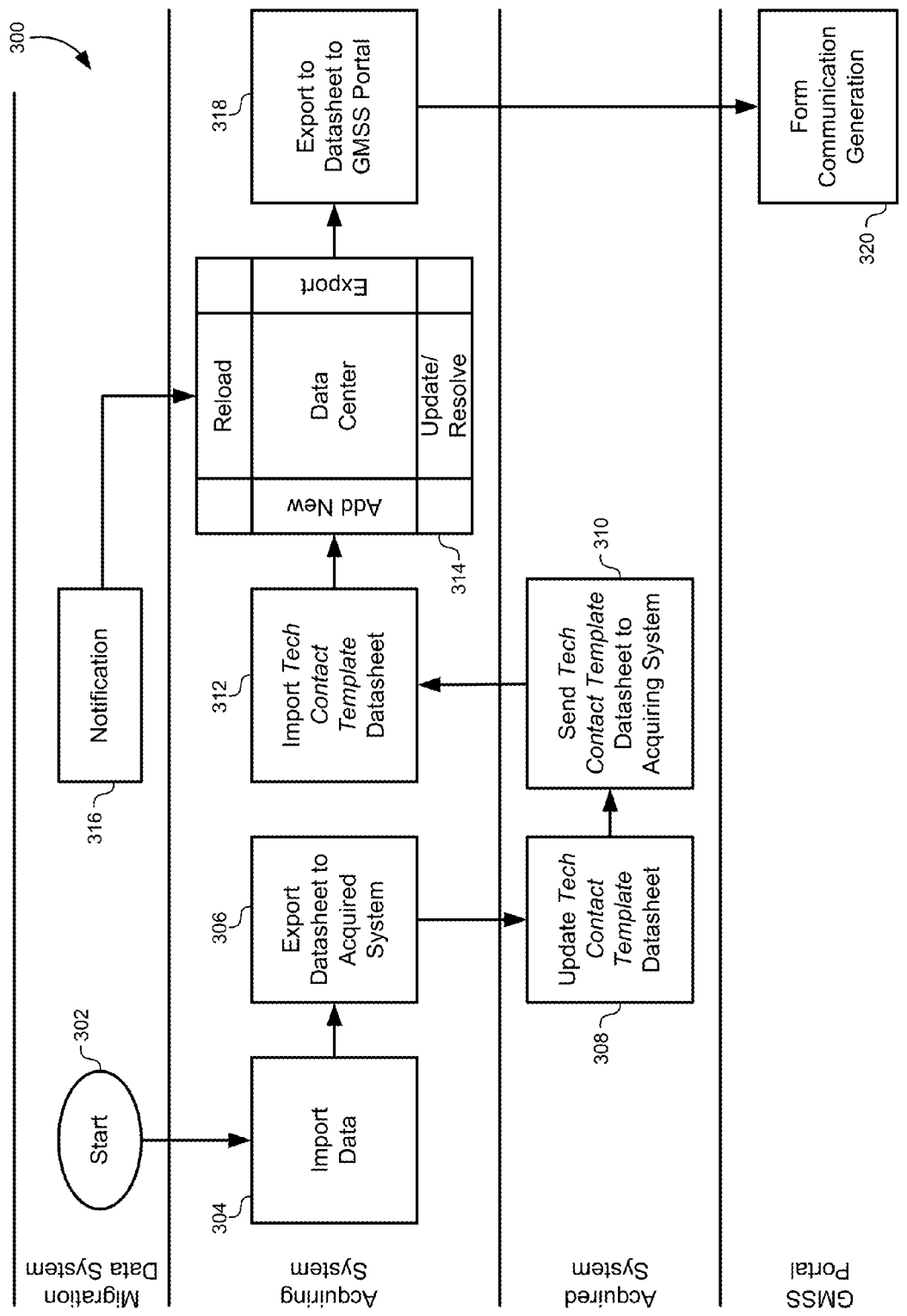
FIG. 3 illustrates a flow diagram of a system for data validation, data correction, and data conversion, according to some embodiments.

FIG. 3 illustrates a flow diagram of a system for data validation, data correction, and data conversion, according to some embodiments. This embodiment focuses on the interaction between the acquiring system and the acquired system in importing and validating data as part of an acquisition. Steps 302 through 312 of FIG. 3 may be accomplished according to the data validation procedure discussed in relation to FIG. 2 above. However, the description of FIG. 3 that follows may include additional details and/or alternative solutions. The acquirer system may import data from various sources (304), such as internal customer records and existing software licenses. This data may be combined and validated according to the process described in relation to FIG. 2. The imported data 304 may be used to generate a template (a "Tech Contact Template") that can then be exported to the acquired system (306). The template can be generated from the imported data and can include data formats, data types, missing data, and/or the like. For example, the acquiring system can provide information from existing customer/contact information and existing software licenses and fill in a customer name, a contact name, a contact email address, and so forth. The template can be constructed to clarify ambiguities within the imported data. For example, if the imported data includes conflicting information for a contact name, the template can specifically request the contact name from the acquired system. The template can also highlight data that is missing from the imported data such that it can be specifically requested from the acquired system. In some embodiments, the template can exclude information that has been validated reliably in the imported data. For example, if the imported data includes a contact address that is validated, then that information need not be requested from the acquired system. In some embodiments, the template may simply define a data format, such as an XML schema, or format similar to <customer>, <contact_no>, <first_name>, <last_name>, <email>, etc.

The acquired system can then update a formatted datasheet based on the template (308) with the requested information. This information can be automatically extracted from the contact and/or customer database at the acquired system. The acquired system can then send the completed datasheet based on the template back to the acquiring system (310). The information from the datasheet based on the template can be imported by the acquiring system through an interface similar to an interface used to receive the imported data earlier in the process (312). The data imported from the datasheet based on the template can then be validated against the imported data previously received. The process described in FIG. 2 may provide error messages and cycle information back and forth between the acquired system and the acquiring system until all errors are resolved and the data is fully validated.

At this point in the process, existing customer data held by the acquiring system has been successfully merged with imported customer data provided to a migration team. However, in addition to the customer data, the contact information has to be obtained for each customer received from the acquired system and formatted according to a common scheme. A user interface can be provided (314) that can allow users to add, reload, export, and update contact information for each customer provided from the acquired system. The user interface tool will be described in greater detail throughout the remainder of this disclosure. After the contact information is completed, this information can be exported as a datasheet to a GMSS portal (318). This datasheet can be formatted such that it can be used by the GMSS portal to generate customer forms, such as welcome letters, letters of intent, and so forth.

FIG. 4 illustrates an example of a user interface for viewing and manipulating imported data at a summary level, according to some embodiments. A user interface 400 may be provided that provides a list of companies that have been acquired by the acquiring company. As shown in FIG. 4, the user interface 400 lists five companies that are part of a current merger and/or acquisition process ("ACME Sales", "Cygnus Tires", "Peart Financial", "Eddie's Guitars", and "Ute Fan Gear"). The user interface can provide a unique project number for each company that can be used to link associated data in a database to the particular company. The interface also provides summary data associated with the imported data. For example, a number of contacts finalized can be shown as a fraction of the total number of contacts loaded from the imported data. A load status can show the most recent activity of the contact finalization process. The company status can show the summary of the progress made in finalizing the contact for each company ("In Process", "Test", "Canceled", "Completed", and so forth). The user interface 400 can also include a graphic that shows the percent completion of the process for finalizing contacts for customers of each company. The user interface 400 can also include a filter that allows users to filter the list of companies based on the summary information. For example, the filter 404 illustrated in FIG. 4 limits the displayed companies to those that have a company status of "In Process", "Test", and/or "Canceled".

The user interface 400 may also include a control 402 that allows the user to add a new company to the company list. The new company may be added as part of an acquisition process when the new company (acquired company) is being merged with the acquiring company. In order to add a new company through the user interface, database tables storing information on the backend of user interface 400 can be updated to include new company information. Although various data structures can be used to store company information, one particular data structure has been found to be advantageous by the inventors. FIG. 5 illustrates a data structure diagram for storing company information, according to some embodiments. In this embodiment, company information can be stored in a company table of a relational database. Each row in the company table can correspond to a unique company acquired by the acquiring system. The data structure of FIG. 5 illustrates the column names that can be used to represent data for each company in the company table. In this embodiment, a plurality of company IDs (in this case 4 company IDs) can be used to identify a particular company. This may include a text string identifier, a unique company numerical identifier, and/or other information that may set one company apart from another. The company table may also include a company name, a company status, a load status, the percent complete, and so forth. It should be noted that this information is also stored as the summary information displayed in the user interface of FIG. 4 for each company. Other information that can be used to log interactions with the company record in the company table can be stored, including information indicating who created the company record, who last updated the company record, when the record was created, and when the last update occurred. Finally, a plurality of company attributes (in this case 12 attributes) may be stored in the company table. These company attributes may be used to represent and store information such as additional information that can be relevant for a customer, yet does not fit within any other specific field. Examples may include a project number used by the acquiring company to identify each acquisition process. Other examples may include request identifiers of program execution in an E-Business Suite. These programs can be used to run various procedures to load and reload a company's data as described above. The request identifiers can also be used to retrieve information regarding the status of the execution of each of these procedures.

Figure 6:
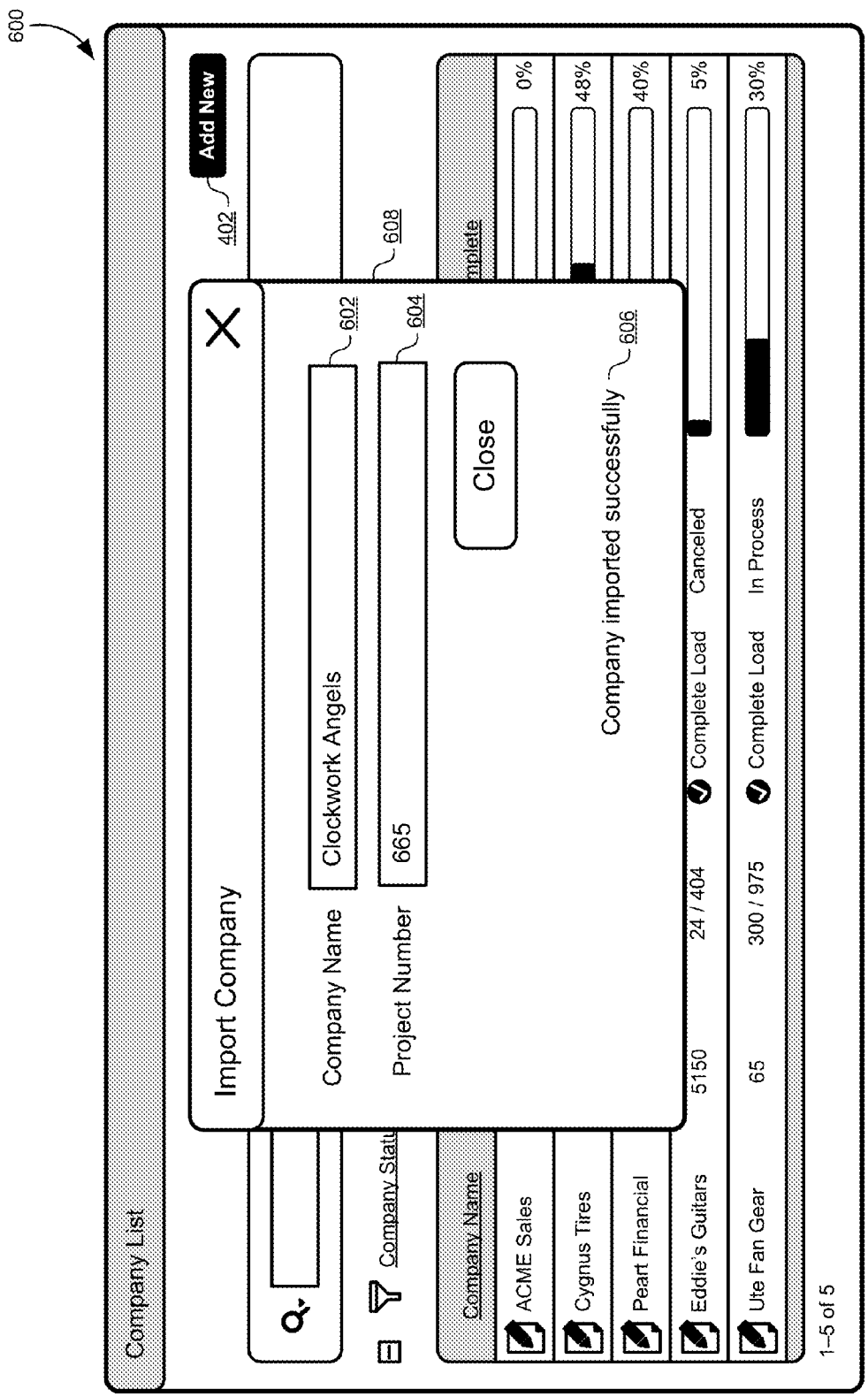
FIG. 6 illustrates an example of a user interface for importing data through using a structured interface, according to some embodiments.

FIG. 6 illustrates an example of a user interface for importing data through a structured interface, according to some embodiments. After selecting the control 402 for adding a new company, the user interface can interact with the database to generate a new company record, i.e. a new row in the company table, into which information for the new acquired company can be stored. The pop-up window 608 can be provided to allow the user to provide basic information for the new acquired company. This information may be limited to a company name 602 and/or a project number 604. By allowing a user to input a minimal amount of information, the opportunity for mistakes and user fatigue is limited.

Figure 7:
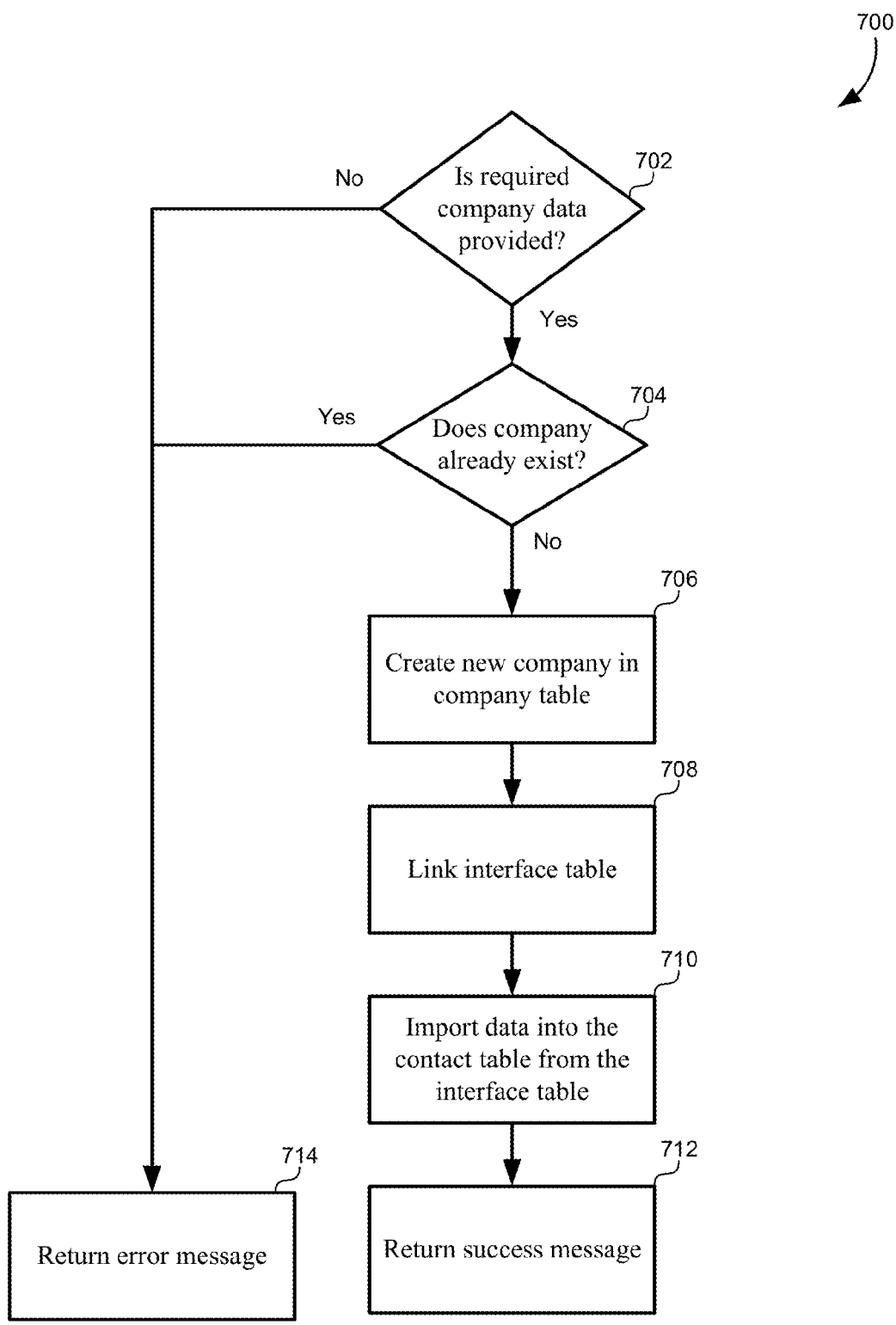
FIG. 7 illustrates a flowchart of a method for importing data through a structured interface, according to some embodiments.

FIG. 7 illustrates a flowchart 700 of a method for importing data through a structured interface, according to some embodiments. Flowchart 700 illustrates the process that is executed by the database after the company information is provided in the pop-up window 608 of FIG. 6. First, the process can determine whether the required company data has been provided (702). If some of the company data (company name/project number) is missing, an error message can be returned (714). If the company data has been provided, then a determination can be made whether another company already exist with the same company data (company name/project number) (704). If the new company data is unique, the process can create a new company in the company table (706).

In order to populate the new row of the company table, a link to an interface table can be created (708). The interface table may be comprised of mappings between columns in the company table and columns in the imported data table from the acquired company system. An example of a mapping table used to link an interface table to an internal table will be given below in FIG. 8. After a mapping has been established between the customer table entry and the imported data for the company, the company data can be imported to the company table using the interface table (710). If this process completes without any errors, a success message may be returned (712). An example of the success message 606 is displayed in FIG. 6.

FIG. 8 illustrates a data structure diagram of a mapping table for linking external data structures with internal data structures, according to some embodiments. The mapping table can include an entry in each row for mappings between various imported data sources and internal database tables. These external tables may be referred to as interface tables or simply as validated data. For example, a mapping table may include a row entry linking columns between an imported data source for company information and the company table described above. The data structure 800 illustrated in FIG. 8 shows columns that can be part of the mapping table. For example, the mapping table may include a global column (e.g., the column in the imported data), a local column (e.g., the column in the company table), a data type, and the data size. Note that mapping tables of this sort may exist for the company table, a customer table, a contact table, and/or any other table storing data for the user interface associated with companies and contact information.

Figure 9:
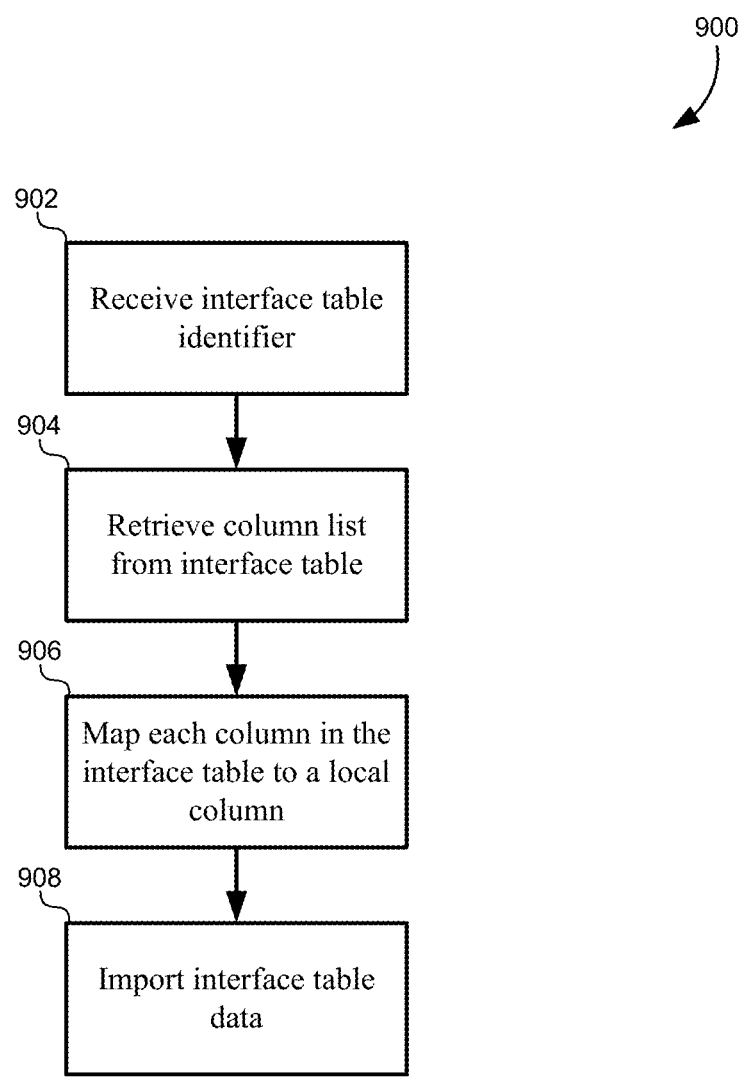
FIG. 9 illustrates a flowchart of a method for establishing a structured interface using a mapping table, according to some embodiments.

FIG. 9 illustrates a flowchart 900 of a method for establishing a structured interface using a mapping table, according to some embodiments. This method may be generically applied to processes of mapping information from validated data tables, such as spreadsheets or data sheets to internal database tables of the user interface for finalizing contact information. The method may include receiving an interface table identifier (902). The identifier may include links to a customer table, a contacts table, or may be provided as part of the validated data provided to the user interface. The method may also include retrieving a column list from the interface table (904). The column list may include a list of columns from the validated data that are to be imported into the user interface. The method may further include mapping each column in the interface table to a local column (906). Each entry in interface table may link a column from the validated data to a column in a local database table. For example, each entry in the interface table may link a column from the validated data to a column in the company table. After the mapping has been established, the method may include importing the validated data to the user interface database tables using the mapping table (908).

FIG. 10 illustrates a data structure diagram for storing contact information, according to some embodiments. When adding a new company, the first step as described above may be inserting new company data into the company table. Next, each company may import contact data from the validated data, as well as customer data from the validated data. Typically, the acquired company will have a number of different customers. Each customer will have one or more contacts through which customer service should proceed. The user interface can upload/import data associated with contacts and customers as part of the process to add a new company. FIG. 10 illustrates a contacts table that may be used to store contact information for customers of a particular company. The data structure 1000 illustrates various column names that can be used in a database table where each row represents a contact. In this example, the contact can be linked to a particular company using a plurality of company IDs (such as 4 company IDs). A plurality of contact IDs (such as 6 contact IDs) may be used to identify the contact. A customer name may link the contact to a particular customer, and the remaining information can be used to identify the contact. This information may include a first name, a last name, a contact email, mailing address with city, state, and ZIP Code, and notes associated with the contact. Similar to the company table, entries in the contacts table may include information indicating when the record was created and by whom, and when the record was last updated and by whom. Finally, a plurality of contact attributes may be used to add descriptive information to the particular context. For example, the contact attributes may include information such as an option to show/hide contract attributes in an interface such as that of FIG. 11. Other contact attributes examples may include a support_ending_date when the contract ends, the support_level indicating a level of support provided by the contract, a region where support is contracted (North America, Europe, Middle East, Africa, etc.), and/or an install_base_address which may be different from the customer address stored in the other columns of this table.

FIG. 11 illustrates a user interface for viewing and editing imported data at a micro level, according to some embodiments. In the user interface described in FIG. 4 the user can select a particular company from the list of companies in order to expand on the summary information provided in FIG. 4. The user interface 1100 of FIG. 11 illustrates how information for a particular company can be displayed to a user in a more detailed fashion. In this example, the company "Peart Financial" has been selected from the interface of FIG. 4, and detailed information regarding contacts and customers of "Peart Financial" are displayed in user interface 1100.

User interface 1100 includes a listing of contacts associated with the company. Each contact may include information, such as a customer name. The customers are customers of the acquired company (Peart Financial) that will now be serviced by the acquiring company. Each customer will have one or more contacts to which welcome letters, subscription information, license information, and/or other customer support information will be sent. Each contact may also include a contact number to enumerate multiple contacts for the same customer. For example, Anthem Bank includes two contacts. Each contact may then include unique identifying information, such as a first name, a last name, an email, a mailing address, and/or the like. In some embodiments, the email may actually be tested and verified in order to ensure that the email is correct. Because email is becoming a primary means of communicating customer support information to customers, it may be important to ensure that the email is valid. Therefore, the contact information may also include a valid email indicator that displays whether or not the email has been determined to be valid. Other information may also include a date when the final document (formatted to create a welcome letter) was last downloaded. To get to the interface where the final document is downloaded the user can click in 'Preview Final' in interface 1100 from FIG. 11. The final document may then be downloaded in a .CSV or other comparable format, after which the "last exported date" is updated when the user clicks on 'Download'.

Other controls may also be included with each contact to help users manipulate contact information. For example, each displayed line of contact information may include a copy control, a bill-to-contact control, a delete control, and so forth. The copy control can allow a user to copy information for one contact to form a new contact. In some embodiments, the mailing address, customer name, and other information that would be shared between all contacts for a customer may be copied, while the unique identifying information (first name, last name, email) would be left blank. This allows users to easily add additional contacts for the same customer without requiring customers to copy common information and/or delete information that would obviously be unique to each contact. A delete control can allow users to delete single contacts, or to delete all contacts associated with a particular customer. For example, clicking the trashcan icon can bring up a window that allows users to delete contact 1 for Anthem Bank, to delete all contacts for Anthem Bank, or to delete all instances of contact "Gary Weinrib" across all customers for Peart Financial. The import bill-to-contact icon can allow users to import the contact's first name, last name, email from the interface table if it exists. Usually the contact information is uploaded/downloaded or updated directly in interface 1100 from FIG. 11 but there are cases in which this information may already exist in the interface table, and this function allows importing directly from the interface table in such cases.

User interface 1100 also includes a filter area 1104 that allows users to filter the contacts displayed in the contact list. In some embodiments, contacts can be filtered by particular customers. For example, the user could select "Anthem Bank" from the customer drop down box and display only contacts associated with Anthem Bank. Users can also select different types of contacts to display based on their type, e.g. by when contacts were last exported/imported, by states, or email domain, etc. The filter area 1104 also allows users to display particular information associated with each customer. This information may include a customer supply ID (CSI), which may be used as an internal identifier for the acquiring company. This information may also include a product number and/or a service part number, each of which can identify particular products or services that the customer is currently subscribed to. For example, by selecting the CSI box, the CSI number for each contact will be displayed in the contact list. The user can then filter records by particular CSI numbers. The filter area 1104 can be modified to allow the user to filter/display the contact attributes from table 1000 in FIG. 10.

User interface 1100 may also include the summary information included in the user interface of FIG. 4. The summary information may include the number of contacts finalized as a fraction of the total number of contacts, percent complete, the project number, the load status, and/or other summary information. Additionally, the user interface 1100 may include a control 1106 that allows a user to select a status for the contact finalization process for the company. Other controls may also be available in user interface 1100, including controls that allow the user to import/export contacts from/to other data sources. For example, a control 102 may allow a user to reload contact information from a source, such as the validated data described above. Other controls may include save, download, upload, preview final, etc. that will be discussed further below.

Figure 12:
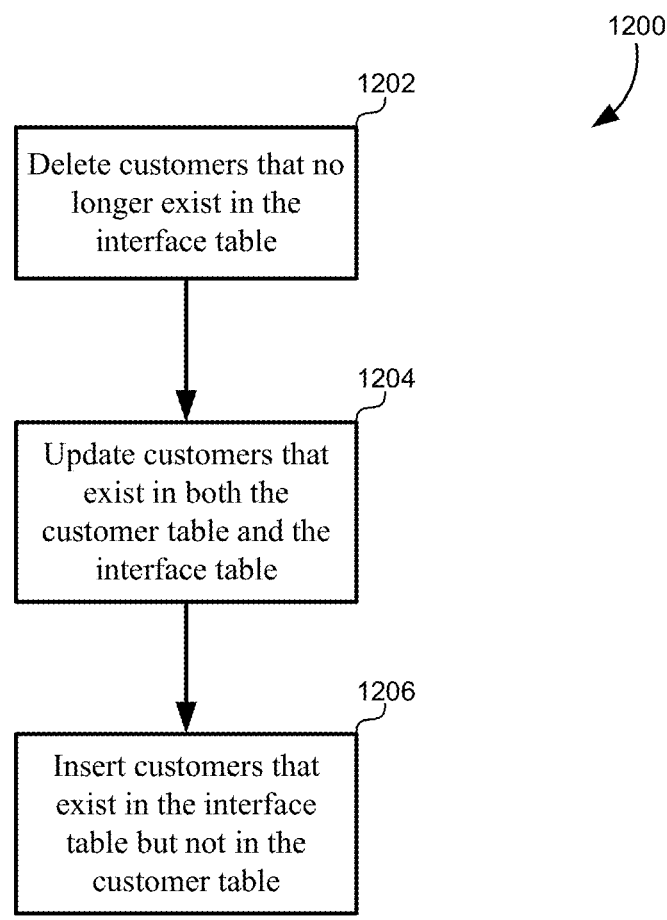
FIG. 12 illustrates a flowchart of a method for updating imported data to reflect changes made to data stored in external data structures, according to some embodiments.

In some cases, the data sources used to generate the validated data may change over time. For example, the acquired company may update their customer list, which would then be sent to the validation computer system and combined with the previously validated data. This type of situation may require the acquiring company computer system to update its customer data that was previously imported from an interface table. FIG. 12 illustrates a flowchart 1200 of a method for updating imported data to reflect changes made to data stored in external data structures, according to some embodiments. Generally, this method may be used to merge previously loaded customer information with new customer information. The method may include deleting customers that no longer exist in the interface table (1202). These customers may have been removed from the acquired company's customer list and are no longer necessary. These can be deleted from the acquiring company's customer log, such that no welcome letter is sent to these customers. The method may also include updating customers that exist in both the customer table and the interface table (1204). These customers may simply include updated information, such as an updated email address, a name change, and/or the like. In some embodiments, conflicting information can be displayed simultaneously to the user such that they can select which of the conflicting information should be preserved going forward. The method may further include inserting customers that exist in the interface table but not in the contacts table (1206). This group may include contacts that have been newly added since the last import from the interface table.

Figure 13:
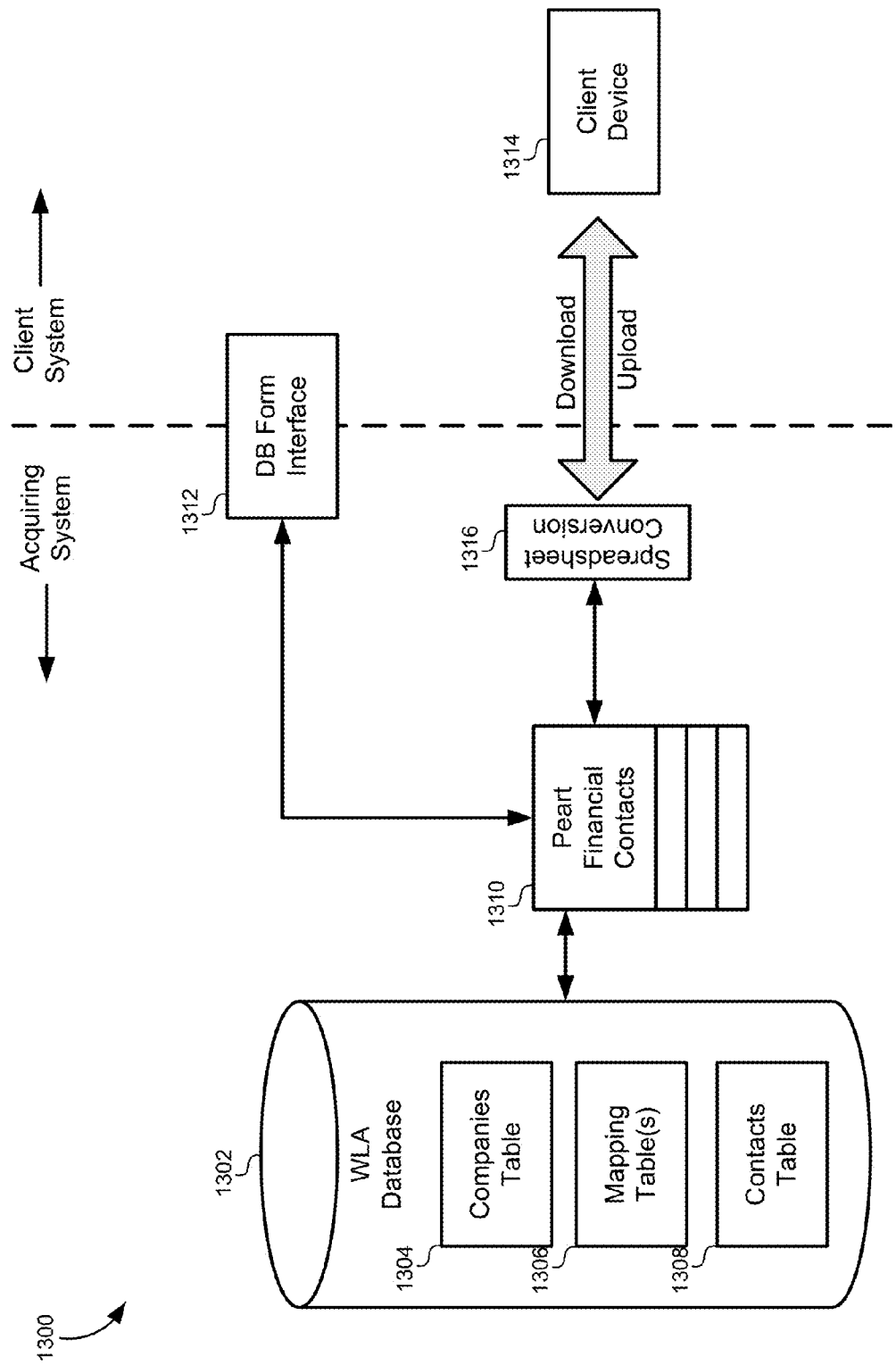
FIG. 13 illustrates a block diagram of a system for updating imported data either using a form interface for downloading a copy of the data to a client device, according to some embodiments.

FIG. 13 illustrates a block diagram 1300 of a system for updating imported data either using a form interface for downloading a copy of the data to a client device or using a user interface, according to some embodiments. A system architecture may include a database 1302 that includes the companies table 1304, the contacts table 1308, one or more mapping tables 1306, and a customers table (not shown). Using the user interfaces described above, users can retrieve records from the companies table and/or records from the contacts table for editing. Often, users will log into a client system that is securely connected to the acquiring company computer system in order to edit these data. For example, contact records 1310 from the contacts table 1308 can be loaded to a user interface provided by the acquiring system 1312 as described above. Alternatively, a spreadsheet conversion module 1316 can extract the contact records 1310 from the database 1302 and convert them into a common spreadsheet format, such as Microsoft Excel. The spreadsheet can then be downloaded to a client device 1314 where the user can edit the spreadsheet on their own time. After editing the spreadsheet, the spreadsheet can be uploaded back to the acquiring system through the spreadsheet conversion module 1316 and stored back in the database 1302.

Figure 14:
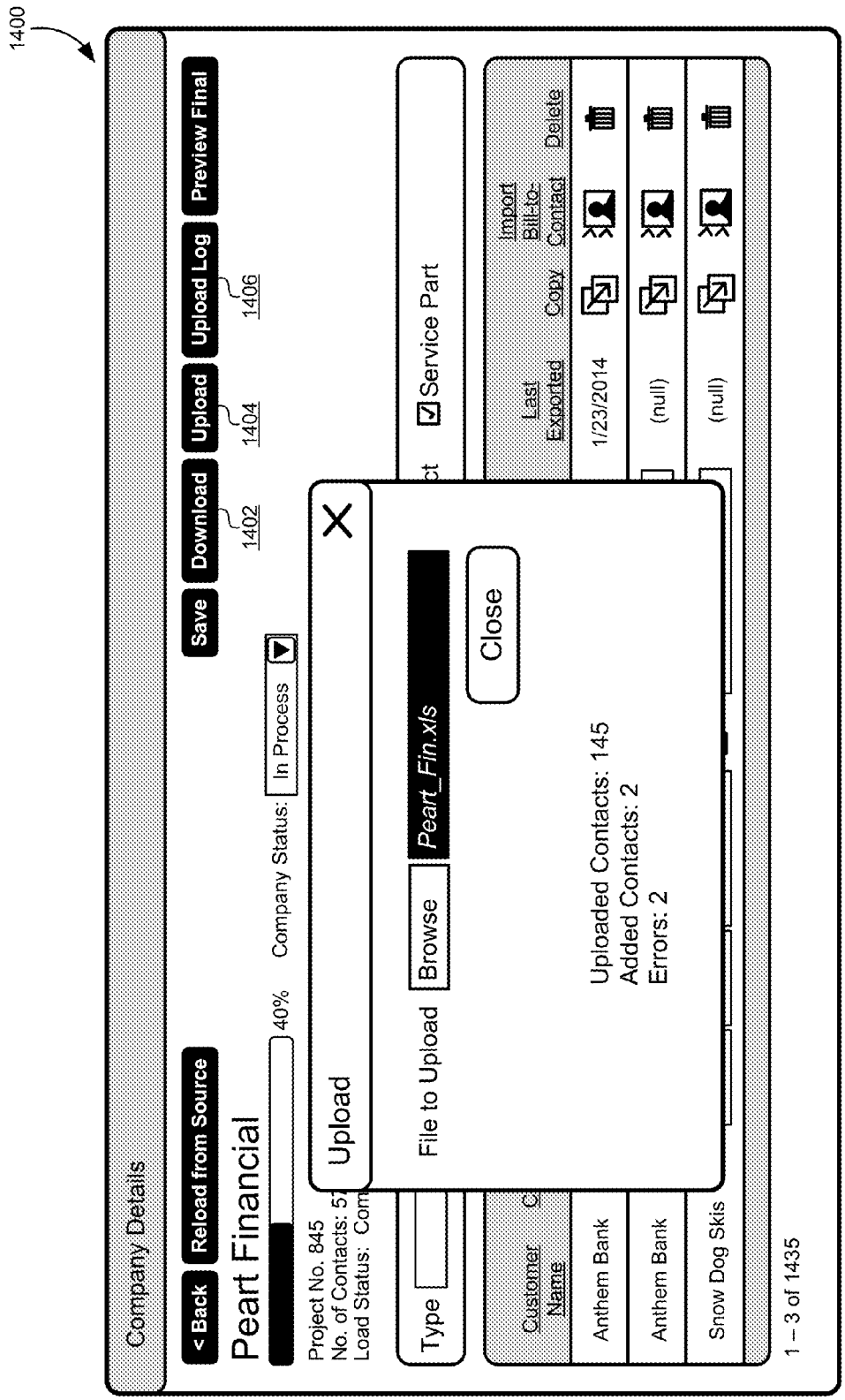
FIG. 14 illustrates an example of a user interface for uploading updated data to a contact table, according to some embodiments.

FIG. 14 illustrates an example of a user interface 1400 for uploading updated data to a contact table, according to some embodiments. In this interface, the user is allowed to download the contact records using a download control 1402, which may provide a pop-up window that allows the user to select a file name and format for the spreadsheet. Similarly, using an upload control 1404, the user can upload the edited spreadsheet that includes the edited contact records. Summary information may be provided in the pop-up window that indicates how many contacts have been uploaded, how many contacts have been added, and how many errors were detected. When data is uploaded from a client device or saved from the user interface 1400, the data validation process described in relation to FIG. 12 may be used.

Figure 15:
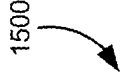
FIG. 15 illustrates an example of a user interface for reviewing and correcting data validation errors in uploaded data, according to some embodiments.

FIG. 15 illustrates an example of a user interface 1500 for reviewing and correcting data validation errors in uploaded data, according to some embodiments. As described in relation to FIG. 2, the data validation process can be a multi-step process where errors are generated and corrected before the data is finally saved back in the database. Interface 1500 illustrates how error messages can be effectively conveyed to a user. In this case, two contacts for Anthem Bank generated errors during upload. For example, a user may have downloaded the contact information for Anthem Bank to edit as a spreadsheet on a local computer. After editing the spreadsheet, the contact data could be uploaded back through the user interface to the database. Before saving the contact data and combining it with the already-existing contact data, the data validation process can be executed that removes orphan records, deletes duplicate records, adds new records, and/or alerts the user to situations where data conflict. In this case, one of the contacts is missing a last name, while the other contact may be listed twice for the same customer. Through this interface, the user can manually edit the data or determine whether or not the duplicate records should be deleted or saved to a different contact.

FIG. 16 illustrates a data structure diagram 1600 of an error table for recording data validation errors during the upload process, according to some embodiments. Each error message can be saved in an error table in the database such that they can be saved and resolved later. One example of the data structure for saving error messages is illustrated by data structure diagram 1600. Each error message can save information that links it to a particular company and/or contact, such as a company ID, a contact ID, and a customer name. The error message can also save summary information for the contacts such that it will be apparent to the user which contact is being referred to by the error message, such as a contact email, a first name, and/or a last name. The error table entry can also store an error message ("missing email address"), as well as more technical error information, such as a debug step/line that can be used by an application designer to troubleshoot the user interface software.

Figure 17:
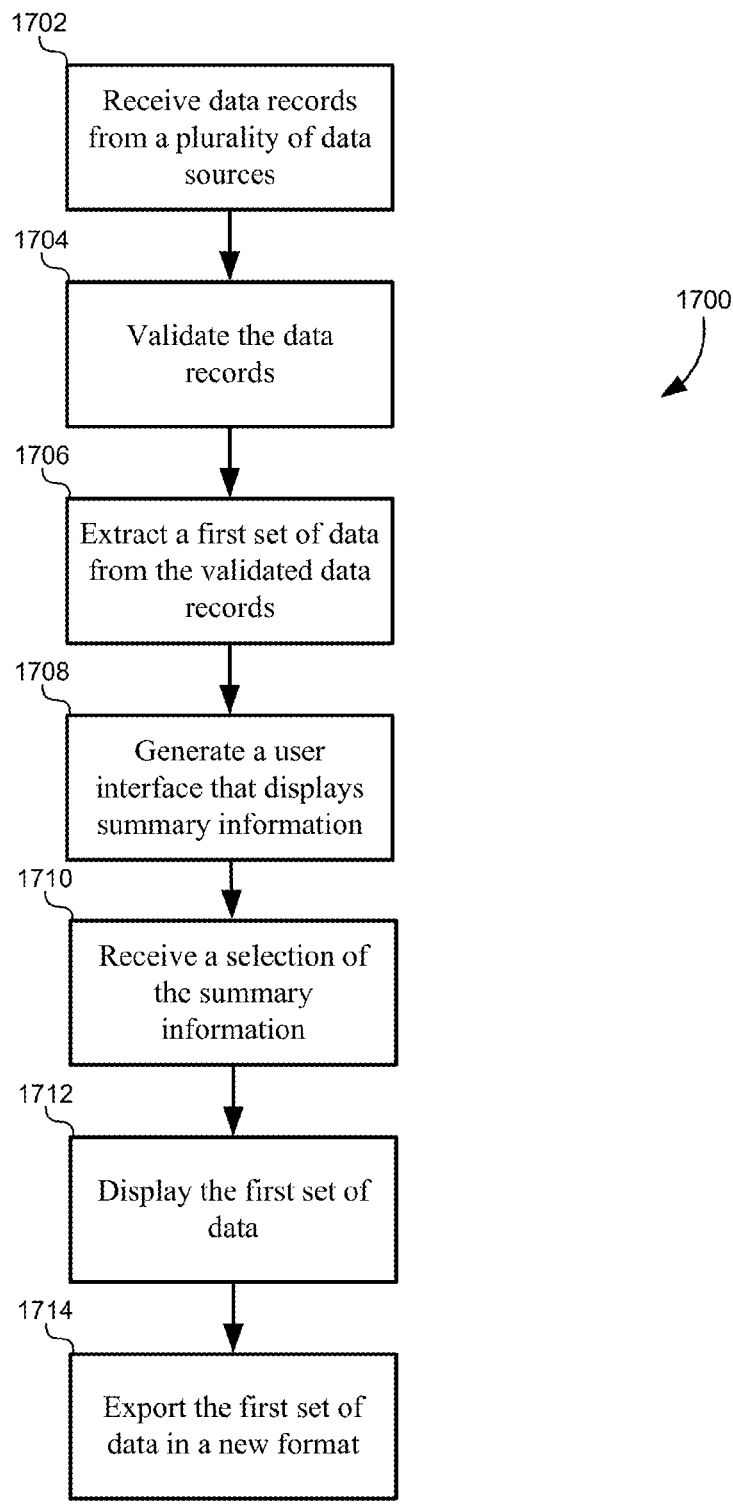
FIG. 17 illustrates a flowchart of a method for method of generating a user interface for validating and finalizing data received from legacy computer systems, according to some embodiments.

FIG. 17 illustrates a flowchart 1700 of a method of generating a user interface for validating and finalizing data received from legacy computer systems, according to some embodiments. The method may include receiving data records from a plurality of data sources (1702). The plurality of data sources may each be associated with legacy computer systems, such as computer systems of an acquired company. Legacy computer systems may also include computer systems of the acquiring company that provide contact information based on current software licenses or internal contact records. The method may also include validating the data records received from the plurality of data sources (1704). The data validation may be carried out by detecting missing values in the data records, detecting duplicate values in the data records, and/or detecting orphan records. The data validation may also include mapping records between the plurality of data sources. The method may additionally include extracting a first set of data from the validated data records (1706). The first set of data may be sourced by a first legacy computer system. In some embodiments, the first legacy computer system may be associated with a particular acquired company system. The first set of data may include information that is stored in a companies table of a database, a contacts table of a database, a customers table of a database, and so forth.

The method may also include generating a user interface that displays summary information associated with the first set of data (1708). The summary information associated with the first set of data may be displayed alongside summary information of similar data records. In one embodiment, the summary information may include information from a companies table, where the user interface displays a list of companies in the companies table. The method may additionally include receiving a selection of the summary information associated with the first set of data (1710). The selection may be received through the user interface by selecting a control of the user interface, or selecting the summary information itself. The selection may distinguish the summary information from the summary information of other companies or computer systems. The method may further include causing the user interface to display the first set of data (1712). In one embodiment, the first set of data may include information from the contacts table related to a selected company. Commands may be received at the first set of data through the user interface. The method may also include exporting the first set of data (1714). The first set of data may be exported through the user interface may be converted into a new data format. For example, the first set of data may be converted into a data format used by a form generation application to generate welcome letters to the contacts.

In some embodiments, the method may include exporting the first set of data to a client device where the data can be edited outside of the user interface. The edited version of the first set of data can then be imported back into the user interface. The edited version of the first set of data can be validated as described above during the import process. In some embodiments, a command may be received by the user interface to upload the first set of data from an interface table. A mapping table may be generated between the interface table and an internal table of the user interface that links the columns of each table. Data can be imported, merged, and validated with existing data records, and/or error messages can be generated.

It should be appreciated that the specific steps illustrated in FIG. 17 and in the other flowcharts disclosed herein provide particular methods of generating a user interface for validating and finalizing data records according to various embodiments of the present invention. Other sequences of steps may also be performed according to alternative embodiments. For example, alternative embodiments of the present invention may perform the steps outlined above in a different order. Moreover, the individual steps illustrated in FIG. 17 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system, such as computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 18:
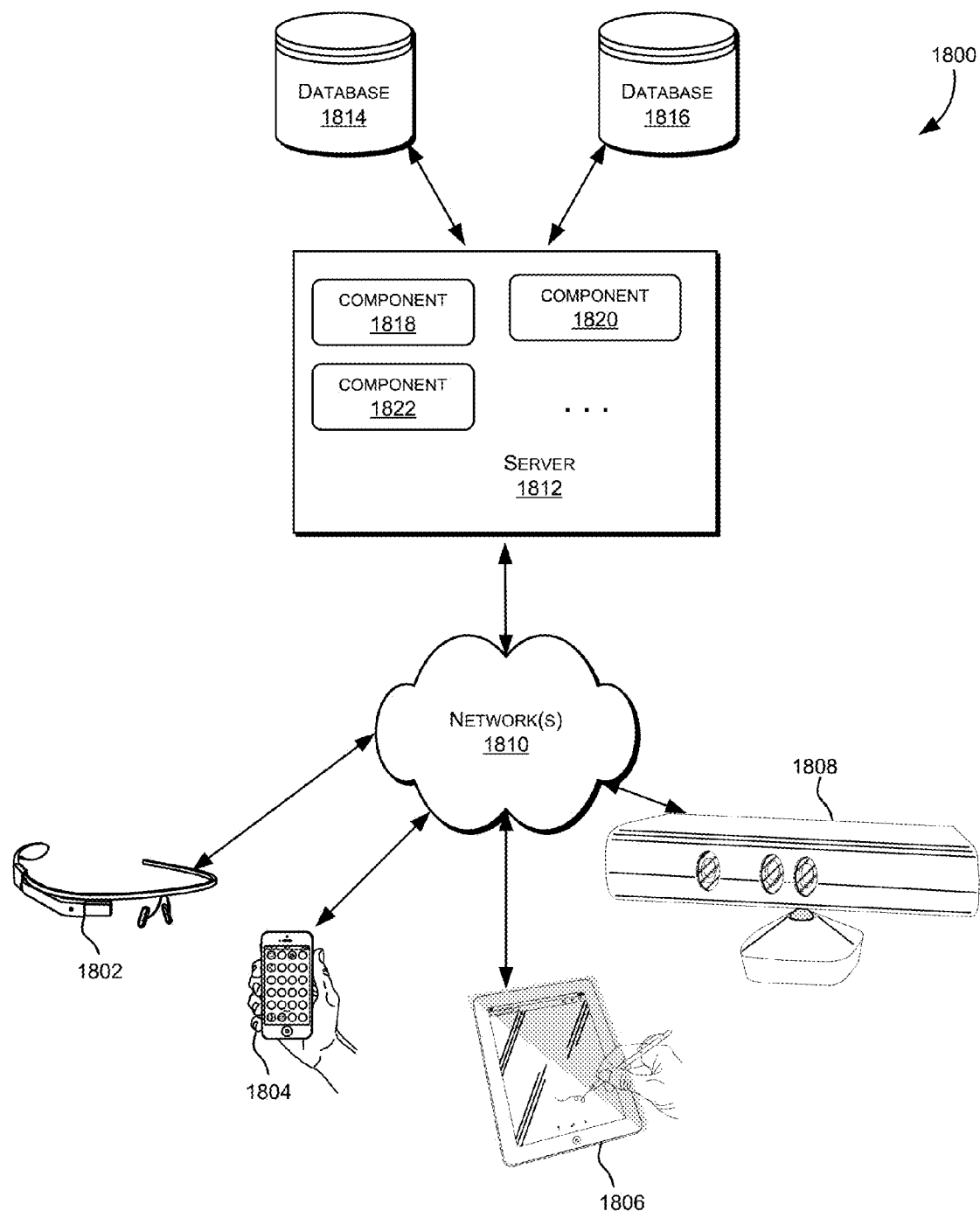
FIG. 18 illustrates a simplified block diagram of a distributed system for implementing some of the embodiments.

FIG. 18 depicts a simplified diagram of a distributed system 1800 for implementing one of the embodiments. In the illustrated embodiment, distributed system 1800 includes one or more client computing devices 1802, 1804, 1806, and 1808, which are configured to execute and operate a client application such as a web browser, proprietary client (e.g., Oracle Forms), or the like over one or more network(s) 1810. Server 1812 may be communicatively coupled with remote client computing devices 1802, 1804, 1806, and 1808 via network 1810.

In various embodiments, server 1812 may be adapted to run one or more services or software applications provided by one or more of the components of the system. In some embodiments, these services may be offered as web-based or cloud services or under a Software as a Service (SaaS) model to the users of client computing devices 1802, 1804, 1806, and/or 1808. Users operating client computing devices 1802, 1804, 1806, and/or 1808 may in turn utilize one or more client applications to interact with server 1812 to utilize the services provided by these components.

In the configuration depicted in the figure, the software components 1818, 1820 and 1822 of system 1800 are shown as being implemented on server 1812. In other embodiments, one or more of the components of system 1800 and/or the services provided by these components may also be implemented by one or more of the client computing devices 1802, 1804, 1806, and/or 1808. Users operating the client computing devices may then utilize one or more client applications to use the services provided by these components. These components may be implemented in hardware, firmware, software, or combinations thereof. It should be appreciated that various different system configurations are possible, which may be different from distributed system 1800. The embodiment shown in the figure is thus one example of a distributed system for implementing an embodiment system and is not intended to be limiting.

Client computing devices 1802, 1804, 1806, and/or 1808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1802, 1804, 1806, and 1808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1810.

Although exemplary distributed system 1800 is shown with four client computing devices, any number of client computing devices may be supported. Other devices, such as devices with sensors, etc., may interact with server 1812.

Network(s) 1810 in distributed system 1800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1810 can be a local area network (LAN), such as one based on Ethernet, Token-Ring and/or the like. Network(s) 1810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1812 may be adapted to run one or more services or software applications described in the foregoing disclosure. For example, server 1812 may correspond to a server for performing processing described above according to an embodiment of the present disclosure.

Server 1812 may run an operating system including any of those discussed above, as well as any commercially available server operating system. Server 1812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1812 may include one or more applications to analyze and consolidate data feeds and/or event updates received from users of client computing devices 1802, 1804, 1806, and 1808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1812 may also include one or more applications to display the data feeds and/or real-time events via one or more display devices of client computing devices 1802, 1804, 1806, and 1808.

Distributed system 1800 may also include one or more databases 1814 and 1816. Databases 1814 and 1816 may reside in a variety of locations. By way of example, one or more of databases 1814 and 1816 may reside on a non-transitory storage medium local to (and/or resident in) server 1812. Alternatively, databases 1814 and 1816 may be remote from server 1812 and in communication with server 1812 via a network-based or dedicated connection. In one set of embodiments, databases 1814 and 1816 may reside in a storage-area network (SAN). Similarly, any necessary files for performing the functions attributed to server 1812 may be stored locally on server 1812 and/or remotely, as appropriate. In one set of embodiments, databases 1814 and 1816 may include relational databases, such as databases provided by Oracle, that are adapted to store, update, and retrieve data in response to SQL-formatted commands.

Figure 19:
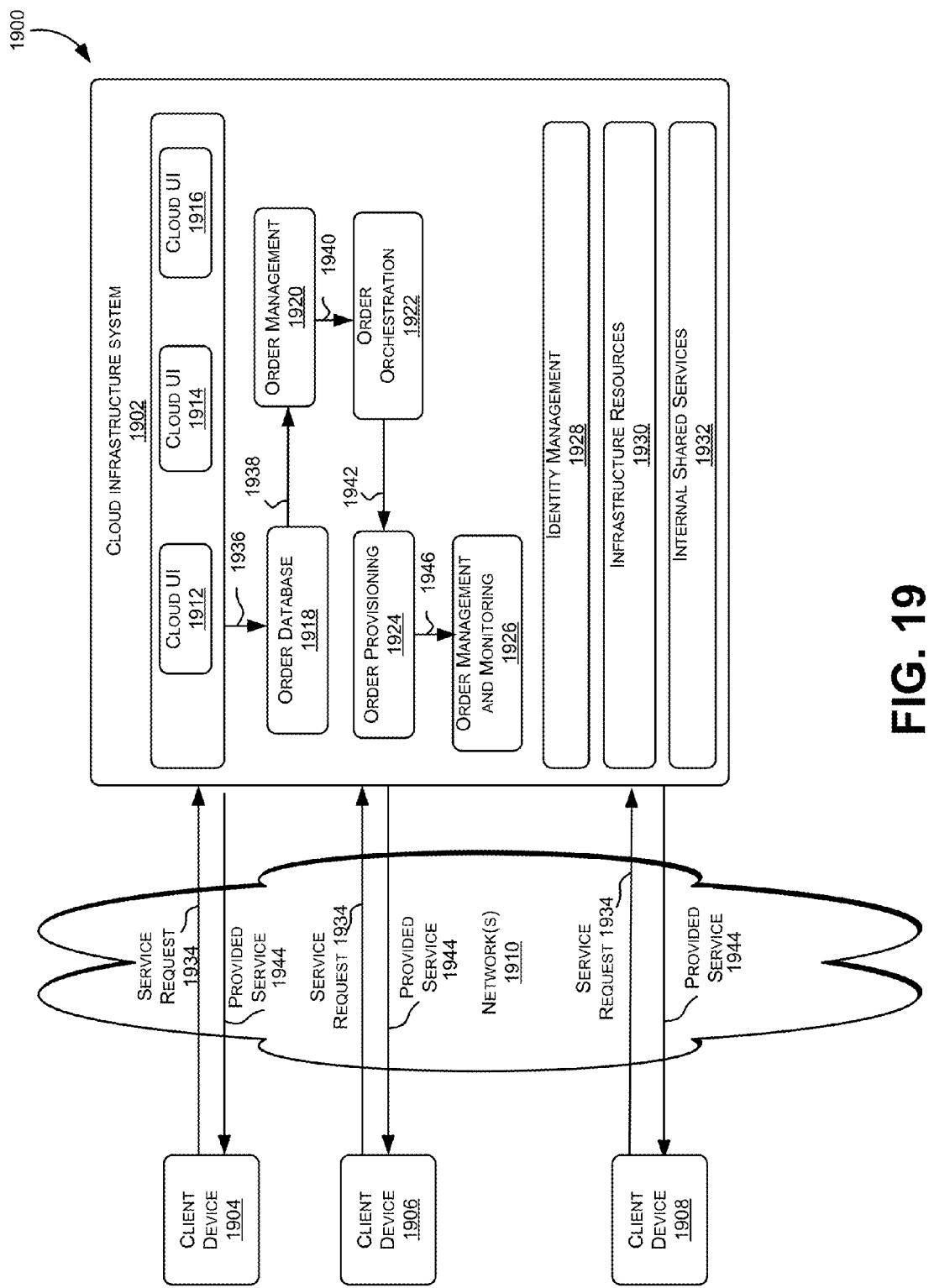
FIG. 19 illustrates a simplified block diagram of components of a system environment by which services provided by the components of an embodiment system may be offered as cloud services.

FIG. 19 is a simplified block diagram of one or more components of a system environment 1900 by which services provided by one or more components of an embodiment system may be offered as cloud services, in accordance with an embodiment of the present disclosure. In the illustrated embodiment, system environment 1900 includes one or more client computing devices 1904, 1906, and 1908 that may be used by users to interact with a cloud infrastructure system 1902 that provides cloud services. The client computing devices may be configured to operate a client application such as a web browser, a proprietary client application (e.g., Oracle Forms), or some other application, which may be used by a user of the client computing device to interact with cloud infrastructure system 1902 to use services provided by cloud infrastructure system 1902.

It should be appreciated that cloud infrastructure system 1902 depicted in the figure may have other components than those depicted. Further, the embodiment shown in the figure is only one example of a cloud infrastructure system that may incorporate an embodiment of the invention. In some other embodiments, cloud infrastructure system 1902 may have more or fewer components than shown in the figure, may combine two or more components, or may have a different configuration or arrangement of components.

Client computing devices 1904, 1906, and 1908 may be devices similar to those described above for 1802, 1804, 1806, and 1808.

Although exemplary system environment 1900 is shown with three client computing devices, any number of client computing devices may be supported. Other devices such as devices with sensors, etc. may interact with cloud infrastructure system 1902.

Network(s) 1910 may facilitate communications and exchange of data between clients 1904, 1906, and 1908 and cloud infrastructure system 1902. Each network may be any type of network familiar to those skilled in the art that can support data communications using any of a variety of commercially-available protocols, including those described above for network(s) 1810.

Cloud infrastructure system 1902 may comprise one or more computers and/or servers that may include those described above for server 1812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1902 may be adapted to automatically provision, manage and track a customer's subscription to services offered by cloud infrastructure system 1902. Cloud infrastructure system 1902 may provide the cloud services via different deployment models. For example, services may be provided under a public cloud model in which cloud infrastructure system 1902 is owned by an organization selling cloud services (e.g., owned by Oracle) and the services are made available to the general public or different industry enterprises. As another example, services may be provided under a private cloud model in which cloud infrastructure system 1902 is operated solely for a single organization and may provide services for one or more entities within the organization. The cloud services may also be provided under a community cloud model in which cloud infrastructure system 1902 and the services provided by cloud infrastructure system 1902 are shared by several organizations in a related community. The cloud services may also be provided under a hybrid cloud model, which is a combination of two or more different models.

In some embodiments, the services provided by cloud infrastructure system 1902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1902. Cloud infrastructure system 1902 then performs processing to provide the services in the customer's subscription order.

In some embodiments, the services provided by cloud infrastructure system 1902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1902 may also include infrastructure resources 1930 for providing the resources used to provide various services to customers of the cloud infrastructure system. In one embodiment, infrastructure resources 1930 may include pre-integrated and optimized combinations of hardware, such as servers, storage, and networking resources to execute the services provided by the PaaS platform and the SaaS platform.

In some embodiments, resources in cloud infrastructure system 1902 may be shared by multiple users and dynamically re-allocated per demand. Additionally, resources may be allocated to users in different time zones. For example, cloud infrastructure system 1930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1932 may be provided that are shared by different components or modules of cloud infrastructure system 1902 and by the services provided by cloud infrastructure system 1902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1902, and the like.

In one embodiment, as depicted in the figure, cloud management functionality may be provided by one or more modules, such as an order management module 1920, an order orchestration module 1922, an order provisioning module 1924, an order management and monitoring module 1926, and an identity management module 1928. These modules may include or be provided using one or more computers and/or servers, which may be general purpose computers, specialized server computers, server farms, server clusters, or any other appropriate arrangement and/or combination.

In exemplary operation 1934, a customer using a client device, such as client device 1904, 1906 or 1908, may interact with cloud infrastructure system 1902 by requesting one or more services provided by cloud infrastructure system 1902 and placing an order for a subscription for one or more services offered by cloud infrastructure system 1902. In certain embodiments, the customer may access a cloud User Interface (UI), cloud UI 1912, cloud UI 1914 and/or cloud UI 1916 and place a subscription order via these UIs. The order information received by cloud infrastructure system 1902 in response to the customer placing an order may include information identifying the customer and one or more services offered by the cloud infrastructure system 1902 that the customer intends to subscribe to.

After an order has been placed by the customer, the order information is received via the cloud UIs, 1912, 1914 and/or 1916.

At operation 1936, the order is stored in order database 1918. Order database 1918 can be one of several databases operated by cloud infrastructure system 1918 and operated in conjunction with other system elements.

At operation 1938, the order information is forwarded to an order management module 1920. In some instances, order management module 1920 may be configured to perform billing and accounting functions related to the order, such as verifying the order, and upon verification, booking the order.

At operation 1940, information regarding the order is communicated to an order orchestration module 1922. Order orchestration module 1922 may utilize the order information to orchestrate the provisioning of services and resources for the order placed by the customer. In some instances, order orchestration module 1922 may orchestrate the provisioning of resources to support the subscribed services using the services of order provisioning module 1924.

In certain embodiments, order orchestration module 1922 enables the management of business processes associated with each order and applies business logic to determine whether an order should proceed to provisioning. At operation 1942, upon receiving an order for a new subscription, order orchestration module 1922 sends a request to order provisioning module 1924 to allocate resources and configure those resources needed to fulfill the subscription order. Order provisioning module 1924 enables the allocation of resources for the services ordered by the customer. Order provisioning module 1924 provides a level of abstraction between the cloud services provided by cloud infrastructure system 1900 and the physical implementation layer that is used to provision the resources for providing the requested services. Order orchestration module 1922 may thus be isolated from implementation details, such as whether or not services and resources are actually provisioned on the fly or pre-provisioned and only allocated/assigned upon request.

At operation 1944, once the services and resources are provisioned, a notification of the provided service may be sent to customers on client devices 1904, 1906 and/or 1908 by order provisioning module 1924 of cloud infrastructure system 1902.

At operation 1946, the customer's subscription order may be managed and tracked by an order management and monitoring module 1926. In some instances, order management and monitoring module 1926 may be configured to collect usage statistics for the services in the subscription order, such as the amount of storage used, the amount data transferred, the number of users, and the amount of system up time and system down time.

In certain embodiments, cloud infrastructure system 1900 may include an identity management module 1928. Identity management module 1928 may be configured to provide identity services, such as access management and authorization services in cloud infrastructure system 1900. In some embodiments, identity management module 1928 may control information about customers who wish to utilize the services provided by cloud infrastructure system 1902. Such information can include information that authenticates the identities of such customers and information that describes which actions those customers are authorized to perform relative to various system resources (e.g., files, directories, applications, communication ports, memory segments, etc.) Identity management module 1928 may also include the management of descriptive information about each customer and about how and by whom that descriptive information can be accessed and modified.

Figure 20:
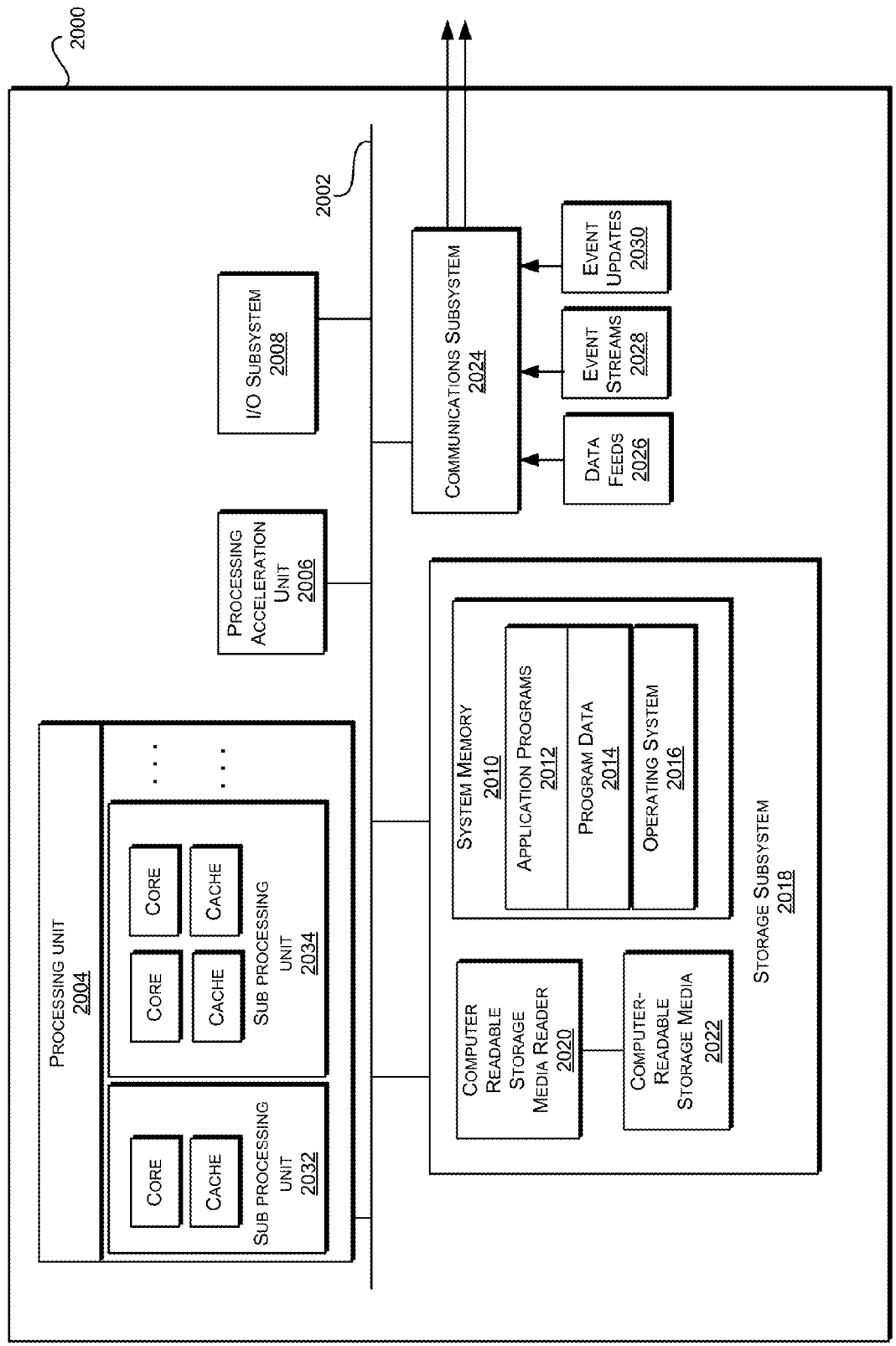
FIG. 20 illustrates an exemplary computer system, in which various embodiments may be implemented.

FIG. 20 illustrates an exemplary computer system 2000, in which various embodiments of the present invention may be implemented. The system 2000 may be used to implement any of the computer systems described above. As shown in the figure, computer system 2000 includes a processing unit 2004 that communicates with a number of peripheral subsystems via a bus subsystem 2002. These peripheral subsystems may include a processing acceleration unit 2006, an I/O subsystem 2008, a storage subsystem 2018 and a communications subsystem 2024. Storage subsystem 2018 includes tangible computer-readable storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative embodiments of the bus subsystem may utilize multiple buses. Bus subsystem 2002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2004, which can be implemented as one or more integrated circuits (e.g., a conventional microprocessor or microcontroller), controls the operation of computer system 2000. One or more processors may be included in processing unit 2004. These processors may include single core or multicore processors. In certain embodiments, processing unit 2004 may be implemented as one or more independent processing units 2032 and/or 2034 with single or multicore processors included in each processing unit. In other embodiments, processing unit 2004 may also be implemented as a quad-core processing unit formed by integrating two dual-core processors into a single chip.

In various embodiments, processing unit 2004 can execute a variety of programs in response to program code and can maintain multiple concurrently executing programs or processes. At any given time, some or all of the program code to be executed can be resident in processor(s) 2004 and/or in storage subsystem 2018. Through suitable programming, processor(s) 2004 can provide various functionalities described above. Computer system 2000 may additionally include a processing acceleration unit 2006, which can include a digital signal processor (DSP), a special-purpose processor, and/or the like.

I/O subsystem 2008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2000 may comprise a storage subsystem 2018 that comprises software elements, shown as being currently located within a system memory 2010. System memory 2010 may store program instructions that are loadable and executable on processing unit 2004, as well as data generated during the execution of these programs.

Depending on the configuration and type of computer system 2000, system memory 2010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2004. In some implementations, system memory 2010 may include multiple different types of memory, such as static random access memory (SRAM) or dynamic random access memory (DRAM). In some implementations, a basic input/output system (BIOS), containing the basic routines that help to transfer information between elements within computer system 2000, such as during start-up, may typically be stored in the ROM. By way of example, and not limitation, system memory 2010 also illustrates application programs 2012, which may include client applications, Web browsers, mid-tier applications, relational database management systems (RDBMS), etc., program data 2014, and an operating system 2016. By way of example, operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2018 may also provide a tangible computer-readable storage medium for storing the basic programming and data constructs that provide the functionality of some embodiments. Software (programs, code modules, instructions) that when executed by a processor provide the functionality described above may be stored in storage subsystem 2018. These software modules or instructions may be executed by processing unit 2004. Storage subsystem 2018 may also provide a repository for storing data used in accordance with the present invention.

Storage subsystem 2000 may also include a computer-readable storage media reader 2020 that can further be connected to computer-readable storage media 2022. Together and, optionally, in combination with system memory 2010, computer-readable storage media 2022 may comprehensively represent remote, local, fixed, and/or removable storage devices plus storage media for temporarily and/or more permanently containing, storing, transmitting, and retrieving computer-readable information.

Computer-readable storage media 2022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2000.

By way of example, computer-readable storage media 2022 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2000.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to connect to one or more devices via the Internet. In some embodiments communications subsystem 2024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2024 can provide wired network connectivity (e.g., Ethernet) in addition to or instead of a wireless interface.

In some embodiments, communications subsystem 2024 may also receive input communication in the form of structured and/or unstructured data feeds 2026, event streams 2028, event updates 2030, and the like on behalf of one or more users who may use computer system 2000.

By way of example, communications subsystem 2024 may be configured to receive data feeds 2026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2024 may also be configured to receive data in the form of continuous data streams, which may include event streams 2028 of real-time events and/or event updates 2030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2024 may also be configured to output the structured and/or unstructured data feeds 2026, event streams 2028, event updates 2030, and the like to one or more databases that may be in communication with one or more streaming data source computers coupled to computer system 2000.

Computer system 2000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of generating a user interface for validating and finalizing data received from legacy computer systems, the method comprising:
   creating a link to an interface table, wherein the interface table stores a first set of data records at a first legacy computer system for a first company in a plurality of companies;
   generating an internal table to store contact records for the first company;
   generating a mapping table between the interface table at the first legacy computer system and the internal table, wherein rows in the mapping table link columns in the interface table to columns in the internal table;
   generating a set of contact records in the internal table based on the first set of data records from the interface table at the first legacy computer system using the link and the mapping table;
   validating the set of contact records by detecting missing values in the set of contact records, detecting duplicate values in the set of contact records, and detecting orphaned records;
   generating a user interface that displays summary information for the set of contact records together with summary information for sets of contact records sourced by legacy computer systems for companies other than the first company;
   receiving, through the user interface, a selection of the summary information for the set of contact records from among the summary information for the sets of contact records;
   causing individual fields in the set of contact records to be displayed through the user interface;
   receiving commands to edit the individual fields in the set of contact records through the user interface; and
   uploading at least a portion of the set of contact records to a system where one or more documents are generated for one or more contacts in the set of contact records.

2. The method of claim 1, further comprising:
   exporting the set of contact records to a client device; and
   importing the set of contact records from the client device, wherein the set of contact records has been edited on the client device.

3. The method of claim 2, further comprising translating the set of contact records into a datasheet format prior to exporting the set of contact records to the client device.

4. The method of claim 1, further comprising:
   receiving a command, through the user interface, to reload the set of contact records;
   re-generating the set of contact records in the internal table based on the first set of data records from the interface table at the first legacy computer system using the link and the mapping table;
   comparing the re-generated set of contact records with the set of contact records; and
   merging the re-generated set of contact records with the set of contact records.

5. The method of claim 4, wherein merging the re-generated set of contact records with the set of contact records comprises:
   detecting contact records that exist in the set of contact records that no longer exist in the interface table;
   detecting contact records that exist in both the interface table and the set of contact records with conflicting values; and
   detecting contact records that exist in the interface table but that no longer exist in the set of contact records.

6. The method of claim 1, further comprising:
   receiving a command, through the user interface, to export the set of contact records to a form generation application, wherein the set of contact records is stored in a first format;
   transforming the set of contact records from the first format into a second format, the second format being used by the form generation application; and
   exporting the set of contact records in the second format to the form generation application which generates a welcome letter from the set of contact records.

7. A non-transitory computer-readable medium comprising instructions which, when executed by one or more processors, causes the one or more processors to perform operations comprising:
   creating a link to an interface table, wherein the interface table stores a first set of data records at a first legacy computer system for a first company in a plurality of companies;
   generating an internal table to store contact records for the first company;
   generating a mapping table between the interface table at the first legacy computer system and the internal table, wherein rows in the mapping table link columns in the interface table to columns in the internal table;

generating a set of contact records in the internal table based on the first set of data records from the interface table at the first legacy computer system using the link and the mapping table;

validating the set of contact records by detecting missing values in the set of contact records, detecting duplicate values in the set of contact records, and detecting orphaned records;

generating a user interface that displays summary information for the set of contact records together with summary information for sets of contact records sourced by legacy computer systems for companies other than the first company;

receiving, through the user interface, a selection of the summary information for the set of contact records from among the summary information for the sets of contact records;

causing individual fields in the set of contact records to be displayed through the user interface;

receiving commands to edit the individual fields in the set of contact records through the user interface; and uploading at least a portion of the set of contact records to a system where one or more documents are generated for one or more contacts in the set of contact records.

8. The non-transitory computer-readable medium according to claim 7 wherein the instructions cause the one or more processors to perform additional operations comprising:

exporting the set of contact records to a client device; and importing the set of contact records from the client device, wherein the set of contact records has been edited on the client device.

9. The non-transitory computer-readable medium according to claim 8 wherein the instructions cause the one or more processors to perform additional operations comprising translating the set of contact records into a datasheet format prior to exporting the set of contact records to the client device.

10. The non-transitory computer-readable medium according to claim 7 wherein the instructions cause the one or more processors to perform additional operations comprising:

receiving a command, through the user interface, to reload the set of contact records;

re-generating the set of contact records in the internal table based on the first set of data records from the interface table at the first legacy computer system using the link and the mapping table;

comparing the re-generated set of contact records with the set of contact records; and merging the re-generated set of contact records with the set of contact records.

11. The non-transitory computer-readable medium according to claim 10 wherein merging the re-generated set of contact records with the set of contact records comprises:

detecting contact records that exist in the set of contact records that no longer exist in the interface table;

detecting contact records that exist in both the interface table and the set of contact records with conflicting values; and detecting contact records that exist in the interface table but that no longer exist in the set of contact records.

12. The non-transitory computer-readable medium according to claim 7 wherein the instructions cause the one or more processors to perform additional operations comprising:

receiving a command, through the user interface, to export the set of contact records to a form generation application, wherein the set of contact records is stored in a first format;

transforming the set of contact records from the first format into a second format, the second format being used by the form generation application; and exporting the set of contact records in the second format to the form generation application which generates a welcome letter from the set of contact records.

13. A system comprising:

one or more processors; and one or more memory devices comprising instructions which, when executed by the one or more processors, cause the one or more processors to perform operations comprising:

creating a link to an interface table, wherein the interface table stores a first set of data records at a first legacy computer system for a first company in a plurality of companies;

generating an internal table to store contact records for the first company;

generating a mapping table between the interface table at the first legacy computer system and the internal table, wherein rows in the mapping table link columns in the interface table to columns in the internal table;

generating a set of contact records in the internal table based on the first set of data records from the interface table at the first legacy computer system using the link and the mapping table;

validating the set of contact records by detecting missing values in the set of contact records, detecting duplicate values in the set of contact records, and detecting orphaned records;

generating a user interface that displays for the set of contact records together with summary information for sets of contact records sourced by legacy computer systems for companies other than the first company;

receiving, through the user interface, a selection of the summary information for the set of contact records from among the summary information for the sets of contact records;

causing individual fields in the set of contact records to be displayed through the user interface;

receiving commands to edit the individual fields in the set of contact records through the user interface; and uploading at least a portion of the set of contact records to a system where one or more documents are generated for one or more contacts in the set of contact records.

14. The system of claim 13 wherein the instructions further cause the one or more processors to perform additional operations comprising:

exporting the set of contact records to a client device; and importing the set of contact records from the client device, wherein the set of contact records has been edited on the client device.

15. The system of claim 13 wherein the instructions further cause the one or more processors to perform additional operations comprising:

receiving a command, through the user interface, to reload the set of contact records;

re-generating the set of contact records in the internal table based on the first set of data records from the interface table at the first legacy computer system using the link and the mapping table;

comparing the re-generated set of contact records with the set of contact records; and merging the re-generated set of contact records with the set of contact records.

16. The system of claim 15 wherein the instructions further cause the one or more processors to perform additional operations comprising:

detecting contact records that exist in the set of contact records that no longer exist in the interface table;

detecting contact records that exist in both the interface table and the set of contact records with conflicting values; and detecting contact records that exist in the interface table but that no longer exist in the set of contact records.

17. The system of claim 13 wherein the instructions further cause the one or more processors to perform additional operations comprising:

receiving a command, through the user interface, to export the set of contact records to a form generation application, wherein the set of contact records is stored in a first format;

transforming the set of contact records from the first format into a second format, the second format being used by the form generation application; and exporting the set of contact records in the second format to the form generation application which generates a welcome letter from the set of contact records.

* * * * *

UNITED STATES PATENT AND TRADEMARK OFFICE
CERTIFICATE OF CORRECTION

PATENT NO. : 9,898,497 B2
APPLICATION NO. : 14/675068
DATED : February 20, 2018
INVENTOR(S) : Ruiz Velazquez et al.

Page 1 of 1

It is certified that error appears in the above-identified patent and that said Letters Patent is hereby corrected as shown below:

In Column 30, Line 37, in Claim 13, after "displays" insert -- summary information --.

Signed and Sealed this
Ninth Day of October, 2018

Andrei Iancu
*Director of the United States Patent and Trademark Office*